US007861918B2

(12) United States Patent
Strabone

(10) Patent No.: US 7,861,918 B2

(45) Date of Patent: Jan. 4, 2011

(54) VOTING SYSTEM AND METHOD

(76) Inventor: Jeff Strabone, 202 Baltic St., Apartment 3, Brooklyn, NY (US) 11201

( * ) Notice: Subject to any disclaimer, the term of this patent is extended or adjusted under 35 U.S.C. 154(b) by 92 days.

(21) Appl. No.: 12/102,748

(22) Filed: Apr. 14, 2008

(65) Prior Publication Data

US 2008/0290163 A1 Nov. 27, 2008

Related U.S. Application Data

(60) Provisional application No. 60/987,271, filed on Nov. 12, 2007, provisional application No. 60/911,726, filed on Apr. 13, 2007.

(51) Int. Cl.

*G07C 13/00* (2006.01)
*G06K 17/00* (2006.01)
*G06F 11/00* (2006.01)
*H04L 9/32* (2006.01)

(52) U.S. Cl. .......................... 235/51; 235/386; 705/12; 713/173

(58) Field of Classification Search .................. 235/51, 235/386; 705/12; 713/173
See application file for complete search history.

(56) References Cited

U.S. PATENT DOCUMENTS 7,077,313 B2 * 7/2006 Chung et al. ................ 235/386
2004/0024635 A1 * 2/2004 McClure et al. ............... 705/12
2005/0218224 A1 * 10/2005 Boldin ....................... 235/386

* cited by examiner

*Primary Examiner*—Michael G Lee
*Assistant Examiner*—Laura Gudorf
(74) *Attorney, Agent, or Firm*—Jerome R. Smith, Jr.; Elman Technology Law, P.C.

(57) ABSTRACT

Systems and methods are disclosed for enabling a voter to vote at any single official polling place in the state (jurisdiction) even if it lies outside the boundaries of his local voting location (division of the jurisdiction). The systems and methods disclosed also prevent voter fraud, including a single voter voting more than once, at any polling place anywhere in the jurisdiction.

12 Claims, 27 Drawing Sheets

FIG. 13A

280

RECEIPT
NEW YORK
PCT. 00001 MACHINE 00578 USER 122
NOV 7, 2006 14:36

PRESIDENT: WILLIAM SHAKESPEARE
U.S. SENATE: EMILY BRONTE
GOVERNOR: FREDERICK DOUGLASS
U.S. HOUSE, 12TH DISTRICT: JONATHAN SWIFT
STATE SENATE, 52ND DISTRICT: JANE AUSTEN
MAYOR: ABSTAIN
PRECINCT SUPERVISOR, 6TH DISTRICT: BARNEY RUBBLE
PROPOSITION 17: YES
PROPOSITION 21: NO

PLEASE PLACE THIS RECEIPT IN THE SLOT TO
CREATE A PAPER TRAIL OF ALL VOTES CAST.

THANK YOU FOR VOTING.

FIG. 15

| | H11SmithDem | H11JonesRep | H11ChangGre | H11Abstain | H12EdgewDem | H12WordsRep | H12SwiftCon | H12Abstain |
|---|---|---|---|---|---|---|---|---|
| 00001 | | | | | | | | |
| 00002 | | | | | | | | |
| 00003 | | | | | | | | |
| 00004 | | | | | | | | |
| 00005 | | | | | | | | |
| 00006 | | | | | | | | |
| 00007 | | | | | | | | |
| 00008 | | | | | | | | |
| 00009 | | | | | | | | |
| ⋮ | | | | | | | | ⋮ |
| 16276 | | | | | | | | |
| 16277 | | | | | | | | |
| 16278 | | | | | | | | |

VOTING SYSTEM AND METHOD

CROSS-REFERENCES TO RELATED APPLICATIONS

This patent application is related to and claims priority from U.S. Provisional Patent Applications, Ser. No. 60/987,271, entitled: Voting System and Method, filed Nov. 12, 2007, and Ser. No. 60/911,726, entitled: Voting System and Method, filed Apr. 13, 2007, the disclosures of both provisional patent applications are incorporated by reference herein.

TECHNICAL FIELD

The disclosed subject matter is directed to a method for voting and systems for allowing voters to vote at polling places other than their local assigned polling place, but within the voter's designated jurisdiction, for example, a U.S. State, as well as systems for preventing fraudulent voting.

BACKGROUND

The most widespread difficulty that voters face on election day is getting to their assigned polling places during working hours. It is generally the case in all or almost all of the United States' states, federal districts, territories, and possessions, that on election day each voter must cast his vote in one and only one unique polling place, that is normally assigned to him based on his residence. This requirement can pose insurmountable obstacles to working people, particularly those who work long hours or commute to work.

Although a voter might spend his entire day at his workplace, he can only vote at the assigned or "home" polling place nearest his residence, which may be as far away from his workplace as a two-hour commute. There is a very good reason that people are required to cast their votes at one and only one unique polling place: the reason is that each precinct represents a particular overlapping of multiple jurisdictions. For example, a voter in Precinct 00076 and a voter in Precinct 00077 might live in the same U.S. House District, the same State Legislative District, but different City Council Districts; therefore, the Precinct 00076 voter and the Precinct 00077 voter must use different ballots on election day.

Another difficulty that voters sometimes face on election day is the breakdown of voting machines. When voting machines break down on election day, voters have no choice but to use paper ballots. The requirement that each voter cast his vote in one and only one unique polling place prevents voters from traveling to other polling places where the machines still work.

In New York (New York in this document meaning the entire state of New York including New York City, and is also known as "New York State") (New York City in this document is the five boroughs of Manhattan, Brooklyn, Queens, The Bronx and Staten Island), for example, each machine at each polling place is precinct-specific, such that each voter must use one and only one unique machine. If one machine breaks down at a polling place in New York, the voters at that polling place cannot use any of the other machines but must instead use paper ballots. Paper ballots are more time-consuming to use, harder to count, and face the added problem of enjoying a lower level of voter confidence that they will accurately be counted, if at all.

Another difficulty that voters sometimes face is a statewide distribution of voting machines that may be inadequate to local voting needs. It is sometimes the case that one polling place will have more voting machines than it needs, while another polling place has too few. It is also sometimes the case that one polling place will receive older voting machines more prone to breaking down while another polling place will be stocked entirely by the newest and most reliable voting machines. The result will always be that a polling place with too few voting machines or too many broken voting machines will produce long lines and long waits for would-be voters. Many voters, regardless of the strength of their patriotism and commitment to voting, will simply be unable, for reasons of health or employment, to spend several hours waiting in line to vote.

Yet another difficulty that voters sometimes face is the casting of provisional ballots at the wrong polling places. Under the Help America Vote Act of 2002 (HAVA), a voter who shows up to a polling place, but whose name is not found on the voting rolls at that polling place, is entitled to cast a provisional ballot. Public Law 107-252, §302(a). It is sometimes the case on election day that a properly registered voter shows up to a polling place other than the one assigned to him. In such an instance, the voter's name will not appear on the voting rolls for the precincts covered by that polling place. Such a voter, although he is properly registered to vote and although his name does appear on the voting rolls at his assigned polling place (unbeknownst to poll workers at the polling place where he has mistakenly arrived to vote), will be issued a provisional ballot according to HAVA. But, according to Electionline.org's March 2005 Briefing, published by the Election Reform Information Project, in the 2004 elections, 28 states did not count provisional ballots cast in the wrong precinct in 2004.

Still another problem that voters sometimes face is the failure to record a vote by absentee ballot. Voters sometimes fail to cast recorded absentee votes for either of two reasons. One is that, although procedures vary from state to state, the difficulty of absentee voting procedures in some states can lead to high numbers of unrecorded or uncast votes due to improperly completed absentee ballots or improperly completed requests for absentee ballots. The other is that people are sometimes called away from home on short notice without foreseeing the need to request an absentee ballot.

SUMMARY

The voting apparatus and voting method of the disclosed subject matter enables every voter within a given jurisdiction, to use any voting machine at any polling place within that jurisdiction yet still cast a precinct-appropriate ballot (or other appropriate ballot for the requisite designated political division), that corresponds to the address where he is registered to vote. Throughout this document, the term "jurisdiction" means a defined political area, for the U.S. or foreign nations. In the U.S. a "jurisdiction", as defined in this document, would be, for example, a state, federal district, territory or possession, collectively referred to hereinafter as a "state." Moreover, for description purposes "jurisdiction" and "state" are used interchangeably throughout this document. As a result of the disclosed subject matter, every voting machine in the jurisdiction or state would be capable of recording votes for any precinct (or other political division) in the jurisdiction or state.

The voting apparatus and voting method of the disclosed subject matter are designed to overcome several obstacles, typical of current election practices. Some of these obstacles are perennial difficulties associated with voters' travels to assigned polling places on election day. Others are difficulties that have been brought to public attention in elections of the past decade. The voting apparatus and voting method herein eliminates these obstacles as it produces a more reliable counting of votes cast than current voting systems allow, prevents the fraud that some associate with electronic voting systems, and creates a level of voter confidence in the electoral process that is suitable to a functioning democratic republic.

The voting apparatus and voting method of the disclosed subject matter enables every voter to vote at any polling place in his state yet still cast the ballot that corresponds to his home precinct. For example, a voter registered and residing in Suffolk County, New York, Precinct 01451, but working in Bronx County, New York could visit a polling place in Bronx County (or anywhere in New York) on his lunch hour, yet still use the precinct-appropriate ballot that corresponds to his Suffolk County home address. For example, this Suffolk County, Precinct 01451 voter could vote in Bronx County, Precinct 00231, and vote on a ballot for Suffolk County, Precinct 01451.

The voting apparatus and voting method of the disclosed subject matter eliminates the problem of individual machine breakdowns by enabling each voter to use any voting machine at any polling place within the state where he is registered to vote.

The voting apparatus and voting method of the disclosed subject matter allows every registered voter to cast a vote at any polling place in the state where he is registered to vote. Thus, for example, if a voter finds the waiting line to vote too daunting at his home or assigned polling place, the voter is free to travel to another polling place which might have shorter lines and properly working voting machines.

The voting apparatus and voting method of the disclosed subject matter provides every polling place with the voter rolls for the entire state. It also enables each voter to cast a precinct-appropriate ballot.

The voting apparatus and voting method of the disclosed subject matter minimizes the number of voters who fail to cast recorded votes due to absentee-related issues. Voters who are far from home on election day but still within the state where they are registered to vote would not need an absentee ballot. Such intrastate-absentee voters could simply vote at any voting machine at any polling place within the state. Only voters who are outside the state (jurisdiction) on election day would need to vote by absentee ballot. Accordingly, the system of the disclosed subject matter reduces the number of voters who need an absentee ballot, and therefore, increases the number of citizens whose votes are cast and recorded, ultimately increasing democratic participation on election day.

The disclosed subject matter is directed to a method for voting, the method includes determining the eligibility of a voter to vote in an election in a jurisdiction, and providing a code corresponding to a division of the jurisdiction in which the voter is registered, if the voter is eligible to vote in the election. If the voter is eligible to vote in this election, a ballot, corresponding to the code, is provided for the voter, from any location in the jurisdiction, the ballot corresponding to the division of the jurisdiction in which the voter has registered.

The disclosed subject matter is directed to another method for voting. The method includes determining the eligibility of a voter to vote in an election in a jurisdiction. If the voter is eligible to vote in the election, he is then provides a ballot at any location in the jurisdiction, the ballot corresponding to a division of the jurisdiction in which the voter is registered.

The disclosed subject matter is also directed to a voting system. The system includes a networked portion and a non-networked portion. The networked portion is designed for verifying the eligibility of a voter to vote in an election in a jurisdiction. The non-networked portion is designed for providing a ballot at any location in the jurisdiction, the ballot corresponding to a division of the jurisdiction in which the voter is registered, if the voter is eligible to vote in the election.

The disclosed subject matter is also directed to another voting system, that includes a first system and a second system. The first system is for verifying the eligibility of a voter to vote in an election in a jurisdiction. The second system is for providing a ballot at any location in the jurisdiction, the ballot corresponding to a division of the jurisdiction in which the voter is registered, if the voter is eligible to vote in the election.

BRIEF DESCRIPTION OF THE DRAWINGS

Attention is now directed to the drawings, where like numerals or characters indicate corresponding or like components. In the drawings:

FIGS. 13A and 13B are paper receipts issued from the voting machine of FIGS. 3 and 4;

FIG. 15 is a diagram of a spreadsheet in accordance with the disclosed subject matter;

DETAILED DESCRIPTION

Figure 1:
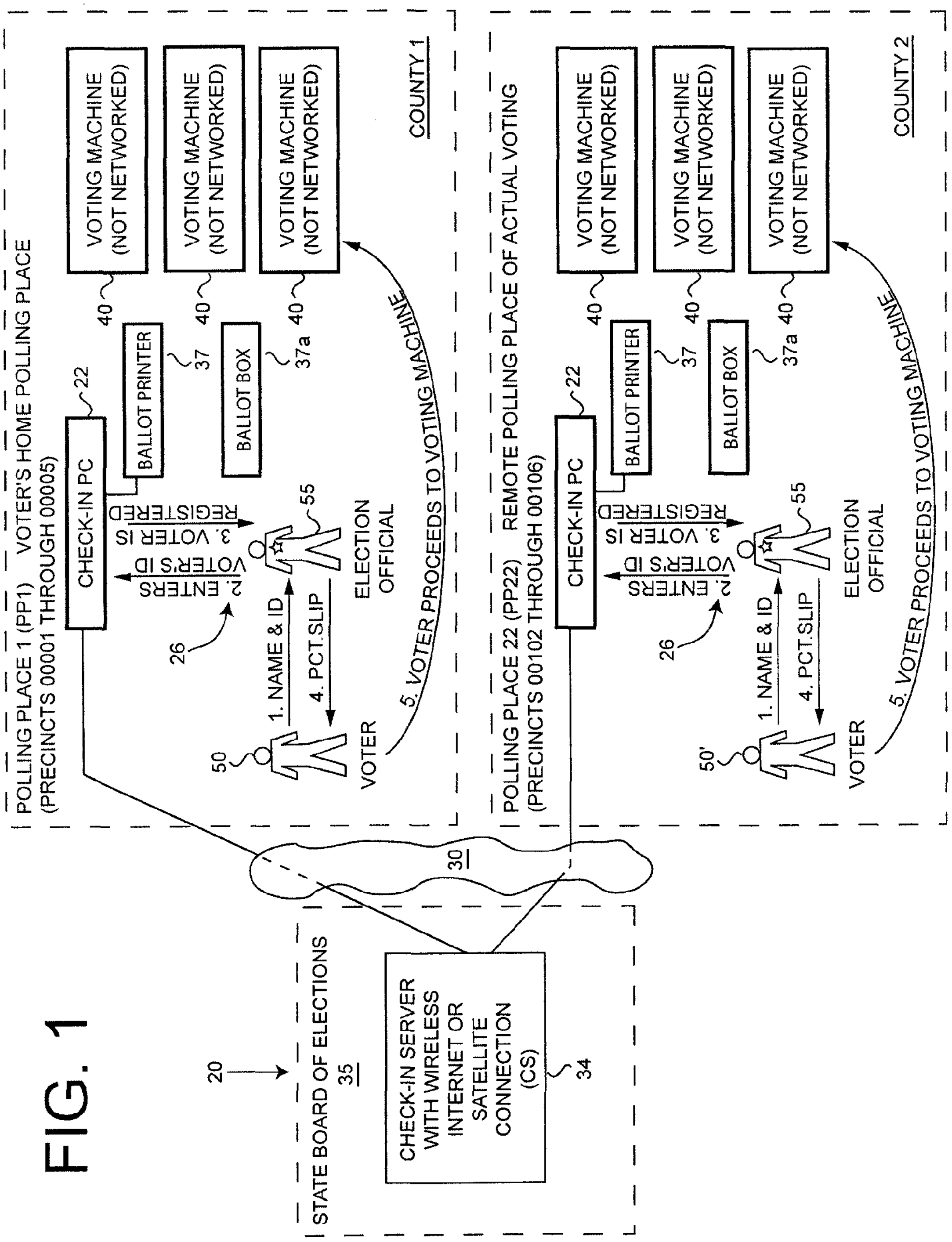
FIG. 1 is a diagram of the voting system of the disclosed subject matter.

The disclosed subject matter is directed to systems and methods for enabling a voter to vote at any single official polling place in the state (jurisdiction) even if it lies outside the boundaries of his local voting location or area (division of the jurisdiction); and controlling the voting process to prevent fraud, including a single voter voting more than once.

For example, the system shown in the drawing figures and detailed below, to illustrate the disclosed subject matter, is based upon the system presently used in New York State. The system can also be adapted for the jurisdictional divisions of all other U.S. States, Territories, Federal districts and Possessions, as well as foreign nations.

In the exemplary system, as detailed below, New York State is divided into jurisdictional divisions, known generally as “Precincts,” “Voting Precincts,” or “Election Districts (EDs) ”, these terms used interchangeably herein. There are presently 16,278 Precincts in the State. New York State also has 62 Counties that contain the 16,278 Precincts. There are approximately 3500 Polling Places (PP), numbered sequentially (from 1 through n, “n” being the last number in the sequence for the approximately 3500 Polling Places), that contain all of the 16,278 precincts, with the approximately 3500 polling places contained by all 62 counties collectively. Each Polling Place is the home or assigned polling place for the voters registered to vote in the corresponding precincts that are designated for that particular polling place, for example, based on geographic location. Accordingly, as shown, for example, in FIG. 1, Polling Place 1 (PP1) (of the approximately 3500 or “n” Polling Places in the State), located in County 1 (of the 62 Counties), covers Precincts 00001 to 00005 (of the 16,278 precincts), while Polling Place 22 (PP22) (of the approximately 3500 or “n” Polling Places in the State), located in County 2 (of the 62 Counties), covers Precincts 00102 to 00106 (of the 16,278 precincts).

Electronic System

FIG. 1 shows a system 20 in accordance with the disclosed subject matter. The system 20 includes terminals 22 at a check-in desk, and corresponding check-in stations 26. The terminals 22 and check-in stations 26 are computers, computing devices, work stations, and the like, that are linked to a network 30, for example, a wide area network such as the Internet, a satellite network, a cellular network, or combined wired and wireless network, typically through gateways (by wired or wireless links or combinations thereof), so as to be in data communication with a check-in server (CS) 34, or other central computer, typically of the Jurisdiction’s Board of Elections 35. Once a voter 50, 50' has checked in at a check-in station 26, they proceed to vote at a voting machine 40, in accordance with the disclosed subject matter, detailed below.

The terminals 22 are electronically linked, by wired or wireless links, or combinations thereof, to ballot printers 37, that print manual (paper) ballots, for example, optical scan ballots, and the like. Each terminal 22 includes a hard drive and/or other hardware and/or software, including interactive storage media, which stores composite visual ballot images (ballots) specific to each of the jurisdiction’s precincts, for example, in New York, the hard drive (and/or the other hardware and/or software) of each terminal 22 would store ballot images for all of the state’s 16,278 precincts.

When desired, the requisite manual ballot will be ordered from the terminal 22 (the election official entering a code or the like) and the electronically linked ballot printer 37 will print a precinct-specific manual ballot for the particular voter, should the voter seek to make one or more write-in selections, or desire a manual ballot, as detailed below, or as situations may necessitate. Additionally, a ballot box 37*a* for the cast manual ballots is maintained under the security of election officials at each polling place, with collection of the ballot boxes 37*a* and security therefore in accordance with conventional election procedures, as detailed below.

Figure 2:
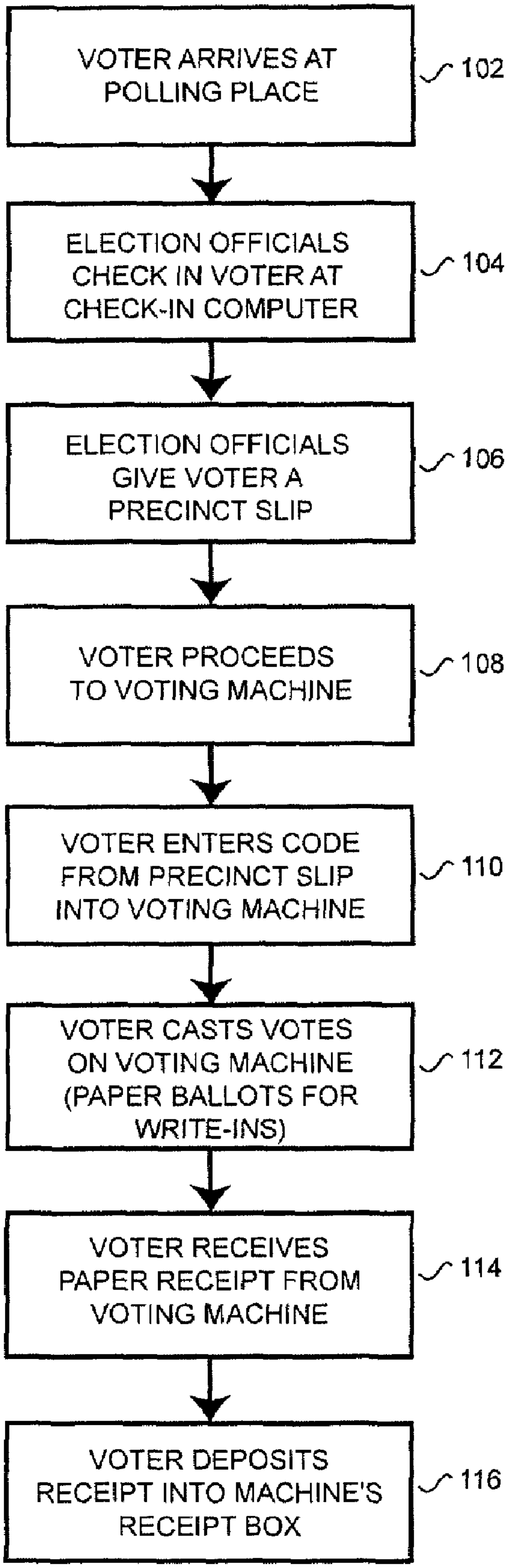
FIG. 2 is a flow diagram detailing the check-in and voting processes in accordance with the disclosed subject matter.

FIG. 2, to which attention is also directed, details an exemplary process in accordance with the disclosed subject matter, for voters 50, 50', shown in FIG. 1. For description purposes, two voters 50, 50', representative of multitudes of voters, are shown in FIG. 1, and will be referred to generally when explaining the disclosed system and method. Voter 50 represents voters who are voting at their home or assigned polling place in their home or assigned precinct. Voter 50' represents voters who are voting remotely, outside of their home or assigned polling place, out of precinct. However, for purposes of example and explanation, the voter 50' will be referenced to show a voter who votes at a polling place outside of his home or assigned polling place for his precinct.

To further illustrate the disclosed subject matter, under presently existing election laws in most jurisdictions, the voter 50' has his home or assigned Polling Place (Polling Place 1), based on the precinct in which he resides, for example Precinct 00001, in a state (County 1 of the state). This voter will receive and vote on a ballot specific to his precinct (for example, Precinct 00001). Normally, the voter 50' would have to vote at this polling place (Polling Place 1, covering Precincts 00001 through 00005, in County 1), as only this polling place would have the correct or precinct-appropriate (precinct-specific) ballot based on his residence and corresponding voting precinct. In accordance with the disclosed subject matter, the voter 50' may now vote at any polling place, within the state (jurisdiction), outside of his home or assigned polling place. For example, voter 50 (whose home precinct is Precinct 00001 as per his voter registration) is voting in his home or assigned polling place, Polling Place 1 (PP1), covering Precincts 00001 through 00005, while the voter 50' (whose home precinct is Precinct 00001 as per his voter registration) has decided to vote close to his workplace, at Polling Place 22 (covering Precincts 00102 through 00106) in County 2, a location and polling place outside of and remote to his home or assigned polling place.

The voting process is now described. The voter 50, 50' arrives at the polling place, at block 102. There is an initial procedure for voters to check in, at block 104. Once a voter 50, 50' is checked in, the voter 50, 50' moves to a voting machine 40, where he votes.

Procedures for Voter Check-In and Voting

Attention is also directed to FIG. 2. Voter check-in involves check-in terminals 22 at the check-in desk, that define the check-in stations 26. Once at the check-in station 26, the voter 50, 50' identifies himself to election official 55 by any acceptably defined identifier that the election authorities of his state (jurisdiction) require. These identifiers, may include, for example, voter registration cards, government-issued identifications, for example, driver’s licenses, passports, birth certificates, military identification cards, and the like. The election official 55 then enters the voter’s 50, 50' identifying information into the terminal 22.

The terminal 22, through the check-in server (CS) 34 provides a confirmation that the voter 50, 50' is in one of three classifications: 1) registered and has not voted in this election; 2) registered and has already voted in this election; or, 3) is not registered. The election official 55 will discern whether the voter 50, 50' is eligible to vote and in which precinct he is eligible to vote.

If the voter 50, 50' is registered and has not voted in this election, the check-in server (CS) 34 indicates via an onscreen display of the terminal 22, or the like, that this voter 50, 50' may vote at the Polling Place, and assigns the voter 50, 50' a code, corresponding to the voter’s 50, 50' home precinct. This code is also known as a precinct code.

If the voter 50, 50' is eligible to vote anywhere in the jurisdiction, for example, the state, the election official 55 will hand-write on a slip of paper the code for that voter's precinct (hereinafter, the "precinct slip"). The election official 55 will then give the precinct slip to the voter 50, 50', at block 106.

The check-in server 34 also includes software, that changes the voter's 50, 50' status, to registered and voted, such that the voter 50, 50' cannot vote again in this election. This change is applicable throughout the jurisdiction, for example, the state, as the voter's check-in is sent over the network to the check-in server 34. The voter 50, 50' is now blocked from going to other polling places (PPs) in the jurisdiction. He will not be able to receive another precinct slip with a precinct code and will not be allowed to vote again in this election. The networked aspect of the check-in terminals (computers) 22 provides security to the system 20, as it prevents voters from voting twice, and it does so without compromising the anti-hacking security features associated with the voting machines 40 not being networked.

Alternately, should the check-in server 34 return the voter status as being registered and voted in this election, or not registered, the voter 50, 50' will not be issued a precinct slip with a precinct code. This blockage is indicated at every check-in station 26 throughout the jurisdiction, preventing the voter from going to another polling place, anywhere in the state jurisdiction).

The voter 50, 50' (determined to be eligible to vote in this election) has now been issued a precinct slip that includes the requisite precinct. The voter 50, 50' now proceeds to the respective voting machine 40, at block 108. The voting machine 40 includes various hardware, software and combinations thereof, including processors and the like for controlling its operations, as detailed herein.

Figure 3:
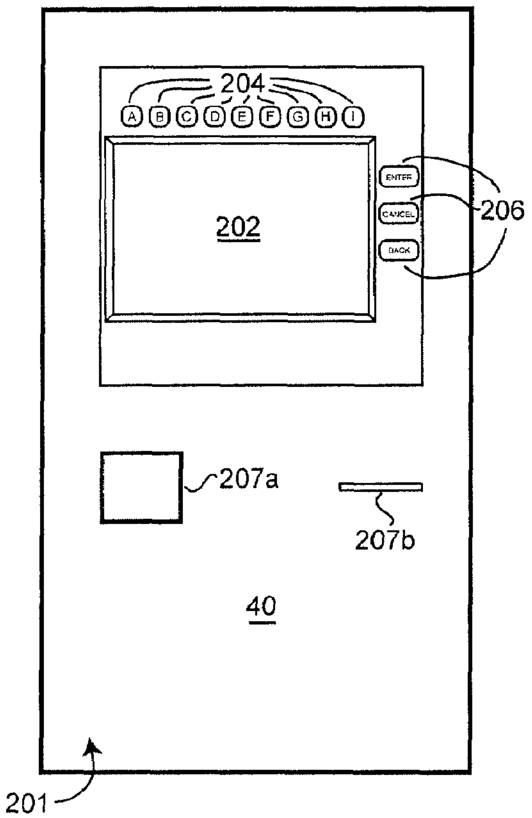
FIG. 3 is a front view of a voting machine of the disclosed subject matter.
Figure 4:
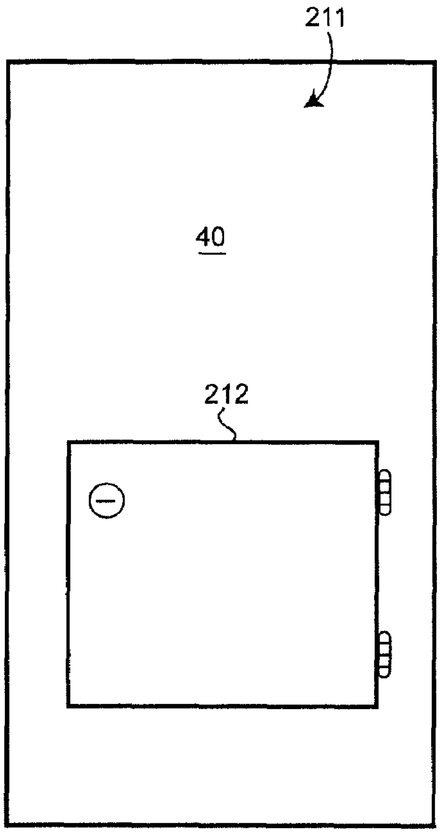
FIG. 4 is a rear view of a voting machine of the disclosed subject matter.
Figure 5:
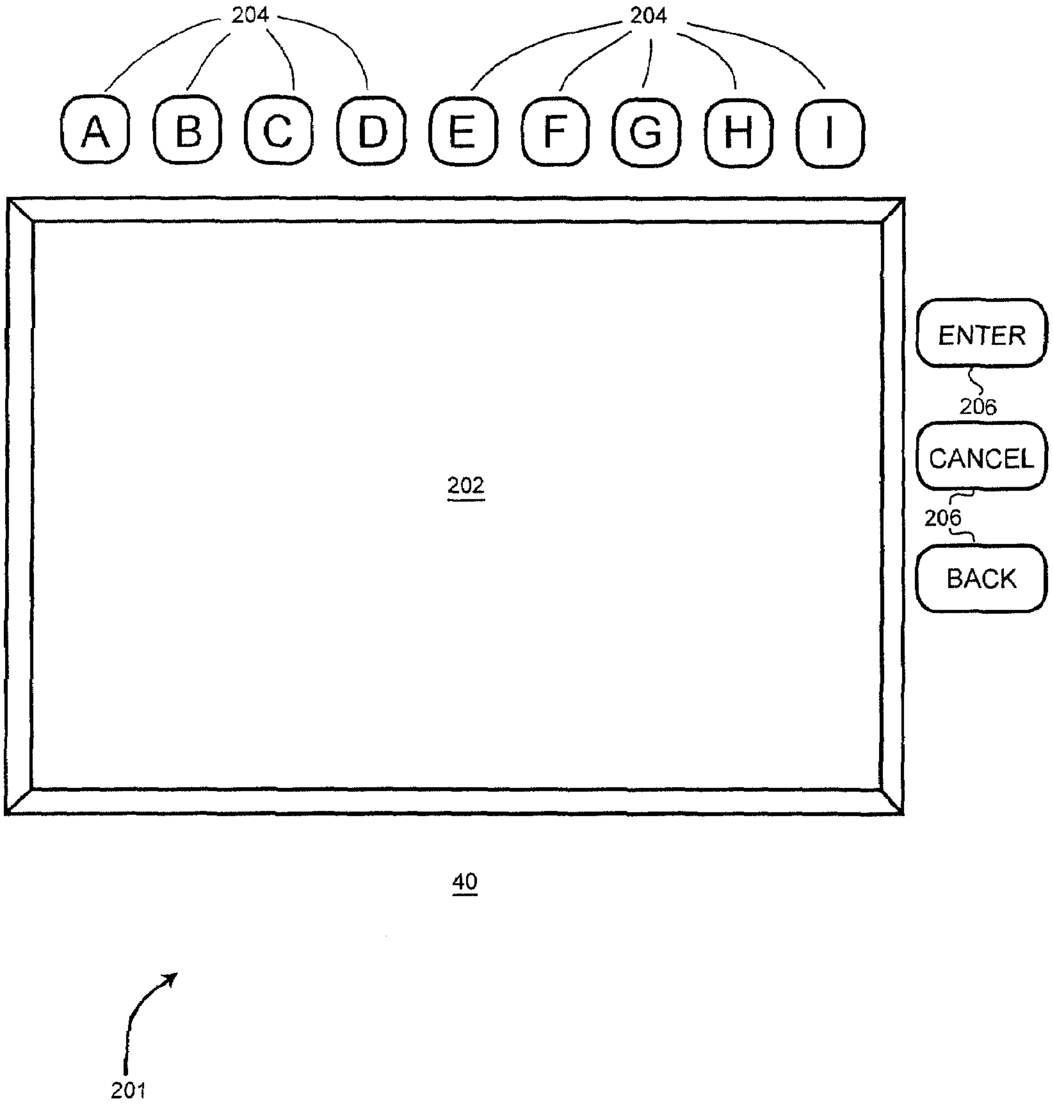
FIG. 5 is a front view of the voting machine of FIGS. 3 and 4 including the monitor.

As shown in FIGS. 3 and 4, the voting machine 40 includes a front side 201 with a screen or monitor 202. Turning also to FIG. 5, selection buttons 204, labeled "A" through "I", are placed horizontally, above the monitor. There are action buttons 206, positioned vertically, and labeled ENTER, CANCEL, and BACK. The voting machine 40 typically uses only buttons 204, 206 for entering votes, but may also use touch-screens. The front side 201 also includes an output tray 207*a*, from which a receipt 280 (FIG. 13A) of that particular voter's selections, precinct, and other information, or 280' (FIG. 13B, in the case of a write-in, where the voter receives a manual ballot, as detailed below) is issued and obtained, and a slot 207*b*, into which the receipt 280, 280' is deposited, as detailed below.

Figure 6:
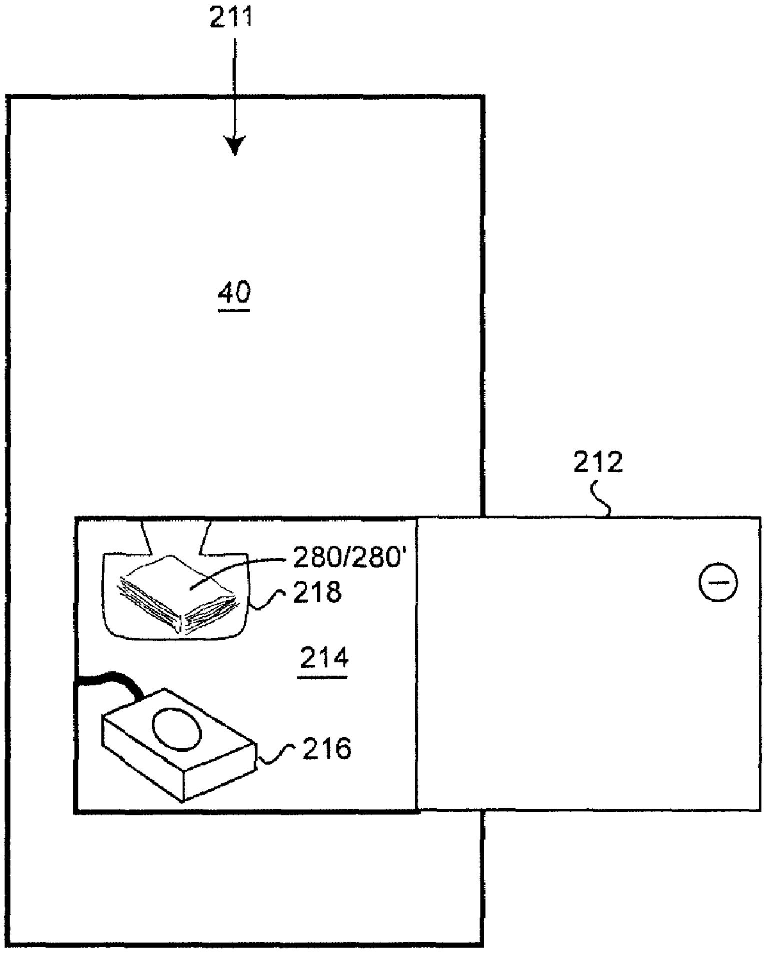
FIG. 6 is a diagram of the components of the voting machine of FIGS. 3 and 4.

The rear side 211 of each voting machine includes a door 212, that is accessible only to election officials. When opened, as shown in FIG. 6, the machine 40 includes a cavity 214 containing a removable hard drive 216, on which the votes are recorded, and a receipt box 218, for receiving the receipts 280/280' through the slot 207*b*. The hard drive 216 serves to record all votes placed by all voters who cast their votes at the specific machine 40. The hard drive 216 is discussed in detail below.

Figure 13B:
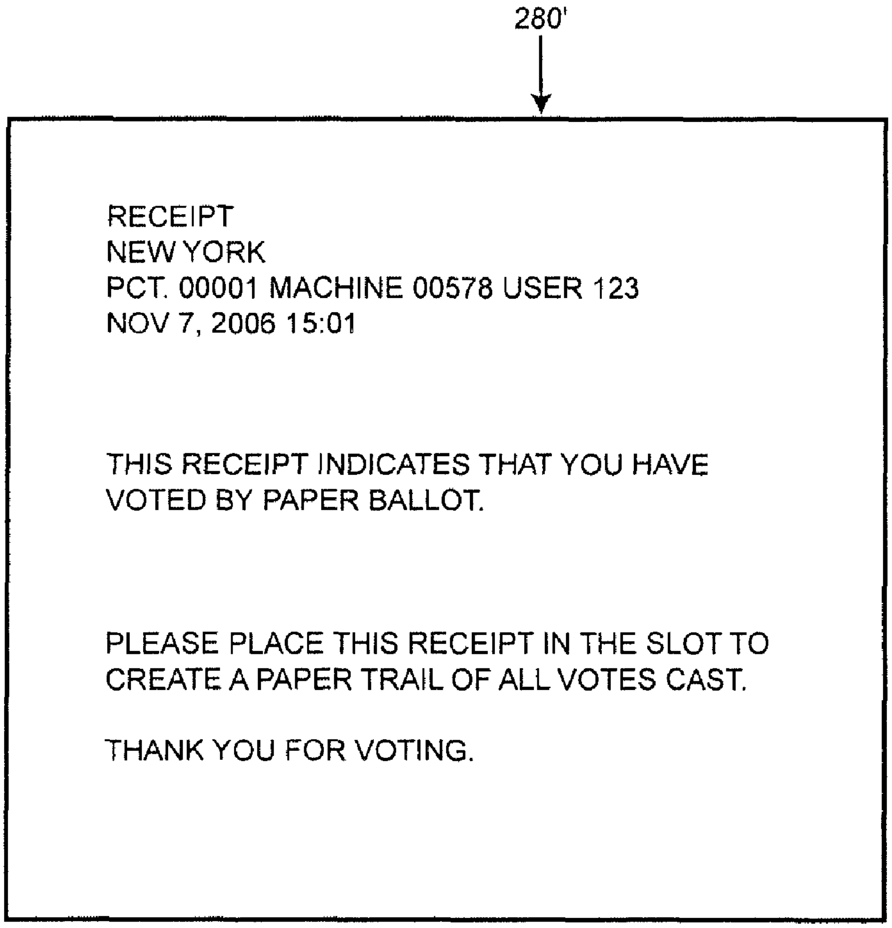

There is also a printer (not shown) and paper rolls (not shown), on which the voting receipts 280/280' are printed, as detailed in FIGS. 13A and 13B below. The voting machine 40, in particular, its hardware and software components, and FIGS. 3-5 are discussed in detail below.

Figure 7:
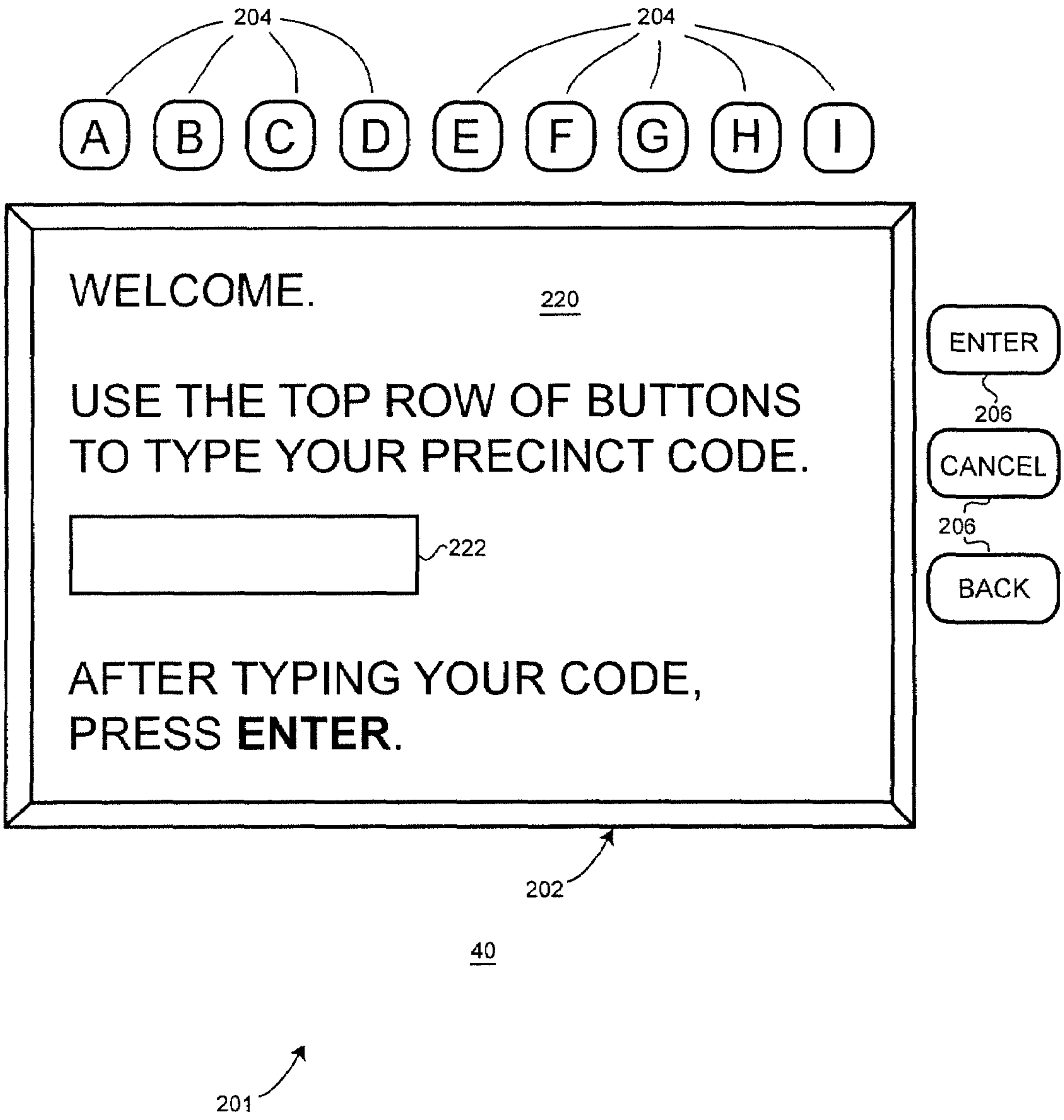
FIGS. 7-12 are screen displays from various portions of the voting process on the monitor of the voting machine.

When the voter 50, 50' arrives at the voting machine 40, each voter 50, 50' sees the screen display 220 of FIG. 7 on the monitor 202. Each one enters his precinct code from the precinct slip by touching the requisite horizontal selection buttons 204, "A" through "I." The precinct code is entered into the box 222 of the screen display 220, at block 110. For example, for security purposes, the precinct code will typically not exactly match the precinct number. Thus, every voter assigned to Precinct 00001, for instance, will be given the code HGDBG in order to diminish the possibility of people deliberately casting votes in the wrong precincts. Accordingly, in this example, the voter 50 receives the Precinct 00001 code of HGDBG, as does the voter 50', voting outside of his home or assigned polling place, voting in Polling Place 22 in County 2. Accordingly, voter 50 and voter 50', regardless of their voting (polling place) location, will see and vote on the same ballot for their home or assigned precinct, for example, the ballot for Precinct 00001, detailed below.

Figure 8:
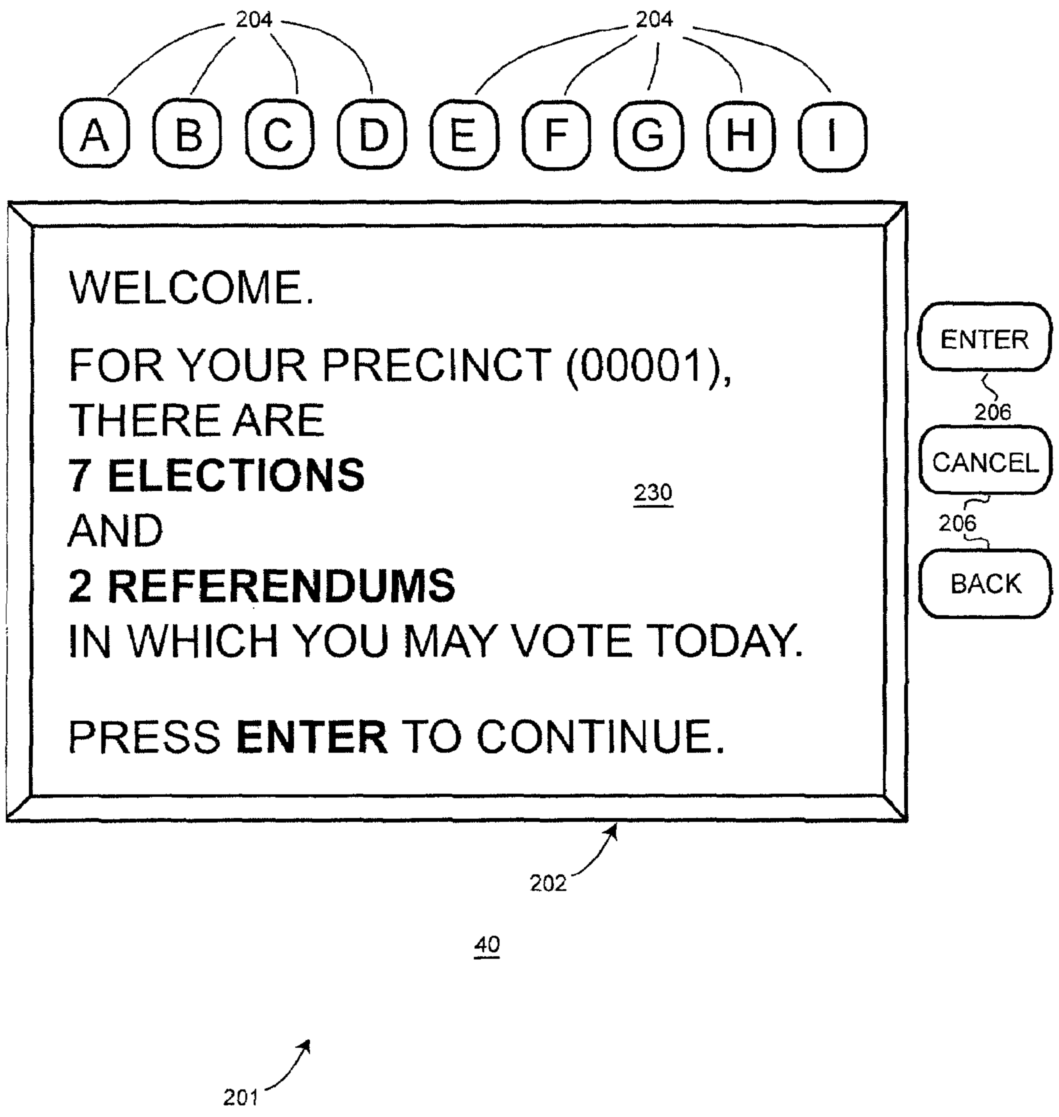

With the precinct code entered, and accepted, the voter 50, 50' touches the action button 206 labeled "ENTER." The voter 50, 50' may now cast his votes, at block 112. The voter 50 now sees a welcome screen display 230 on the monitor 202, as shown in FIG. 8. The screen display 230 indicates how many contests and questions he can vote in, e.g., seven contests and two questions, for his jurisdiction or state, its divisions, all the way down to his specific precinct. To continue and move to the next screen display, the voter 50, 50' touches the action button 206 labeled "ENTER."

The exemplary process will now continue with a description for one voter, voter 50', representative of all voters, who are voting outside of their home or assigned polling place. The voter 50' now receives a ballot for his precinct, that corresponds to the precinct code he entered into the machine 40. For example, the voter 50' voting at Polling Place 22 in County 2, has received a ballot for his home or assigned precinct, Precinct 00001. The ballot is in the form of electronic data, as stored on the hard drive 216, and will include successive screen displays for each contest, question and instruction screen displays.

For example, in this particular election, for a voter, registered in Precinct 00001, assigned to a home poling place, Polling Place 1 in County 1, the voter will see seven screen displays followed by instruction and/or informational screen displays, as stated here, and further described below. For example, this voter 50' (at a polling place other than his home or assigned polling place, and here, for example, a polling place in another county) will now see successive screen displays for elections for President, U.S. Senate, Governor, U.S. House 12th District, State Senate 52nd District, Mayor, Precinct Supervisor (for Precinct 00001), Proposition 17 and Proposition 21. These screen displays will be followed by instructional and/or informational screen displays, as detailed below.

Figure 9:
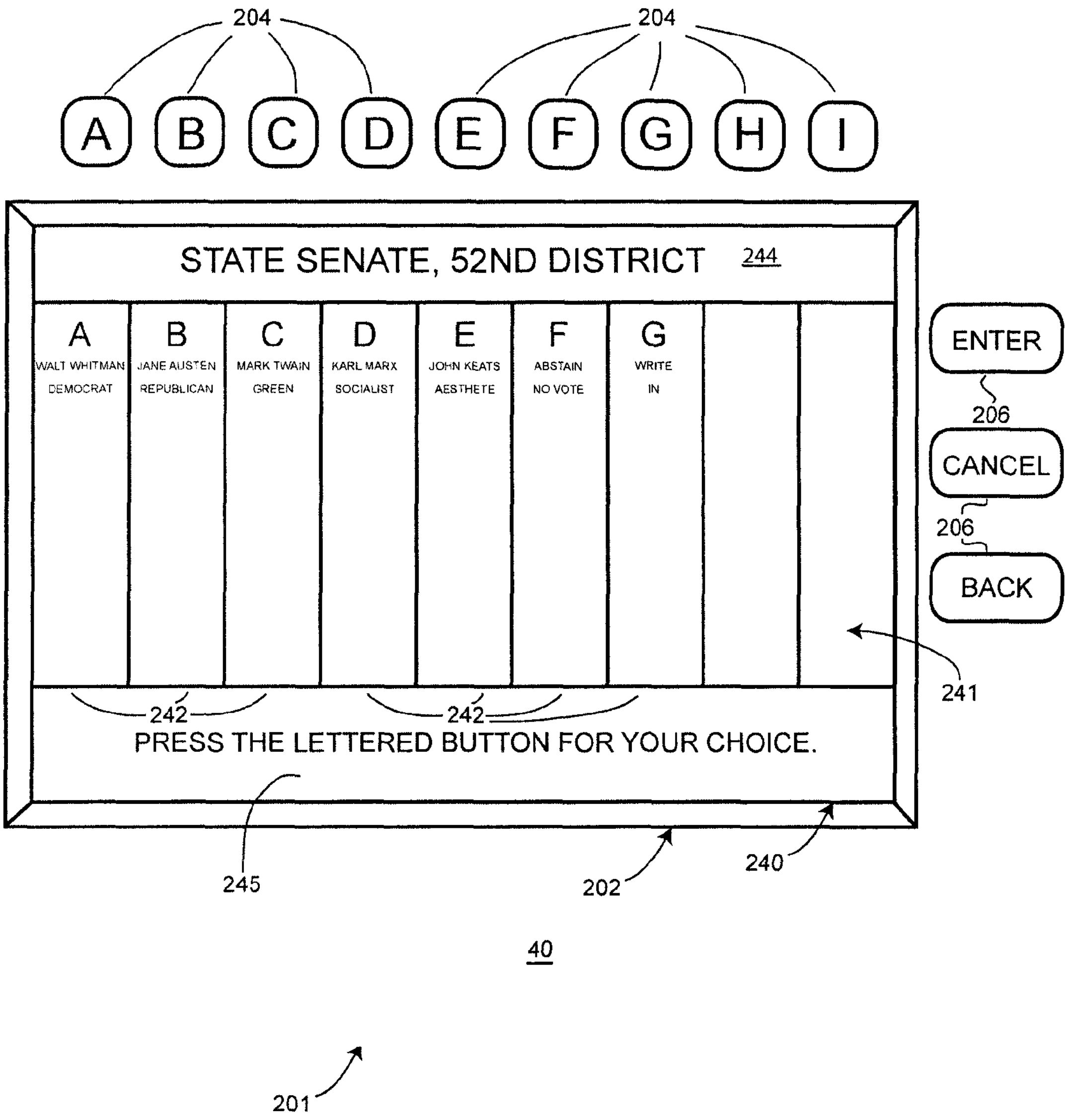

For example, for voter 50', an exemplary screen display for a candidate election or contest is shown in FIG. 9, to which attention is also directed. After having made choices in the President, U.S. Senate, Governor, U.S. House 12th District contests, the voter 50' now sees a screen display 240 on the monitor 202, for the State Senate 52nd District contest. The ballot 241 appears as the screen display 240 (as the middle element), with columns 242, for example, for this particular contest, six columns, each column 242 corresponding to and appearing under one of the first six horizontally positioned selection buttons 204, labeled "A" through "F," above the monitor 202. Each of the six columns corresponds to a choice for the contest, for example, a candidate name, or an action, such as abstain, write-in or the like. The top visual element 244 of the screen display 240 will name the contest or question, for example, STATE SENATE, 52nd DISTRICT. The bottom visual element 245 of the screen display 240 may be an instruction, for example "PRESS THE LETTERED BUTTON OF YOUR CHOICE", other informational segment, or the like.

Figure 10A:
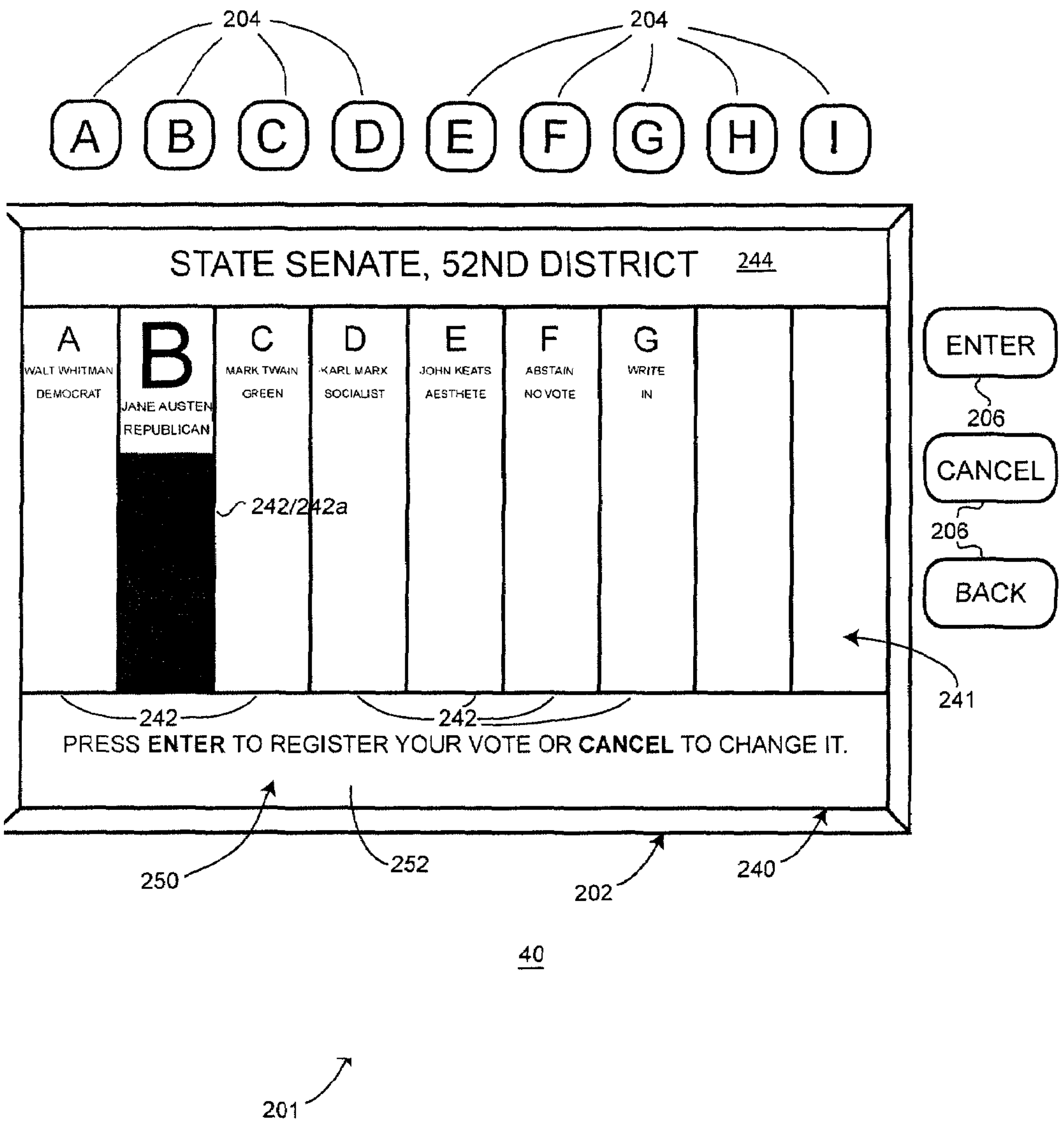

The voter 50' indicates his vote by pressing the button 204 above the column 242. For example, this voter 50' has selected JANE AUSTEN, a REPUBLICAN, as shown in the screen display 250 of FIG. 10A. The top visual element 254 remains the same as the previous screen display (top element 244). At that point, the lower portion 242*a* of the column 242 of the voter's choice becomes illuminated and may contain the words, "Your vote for State Senate, 52nd District is JANE AUSTEN." The bottom element 255 of the screen 250 will say, "PRESS ENTER TO REGISTER YOUR VOTE OR CANCEL TO CHANGE IT." If the voter 50' agrees that this is how he wants to cast his vote, he will press the ENTER button 206. If he does not agree that this is how he wants to cast his vote, he can press the CANCEL button 206 and try again in this contest.

One column, for example, the column corresponding to the "F" button 204, will always contain the choice to abstain, and when necessary, one column, for example, the column corresponding to the "G" button 204 will contain the choice to write-in a candidate. If this write-in option, for example, as represented by the "G" button 204, is activated and accepted by the voter 50', the process stops. The voter 50' will be issued a manual (paper) ballot by an election official. An election official will also reset the voting machine, and upon being reset, data corresponding to this reset is stored in the hard drive 216 of the machine 40, as detailed below. For example, as a default, the voting machine 40 can be programmed such that pressing the ENTER button 206 before casting a vote in a given contest will also register an abstention in a contest or question.

With the selection of candidate JANE AUSTEN complete, and the voter 50' having touched the action button 206 labeled "ENTER", the next contest (slate of candidates), questions, referendums or other voting issues, will appear onscreen. For example, for the voter 50', successive screen displays will appear for the elections for Mayor and Precinct Supervisor, followed by questions, referendums, and the like.

Figure 11:
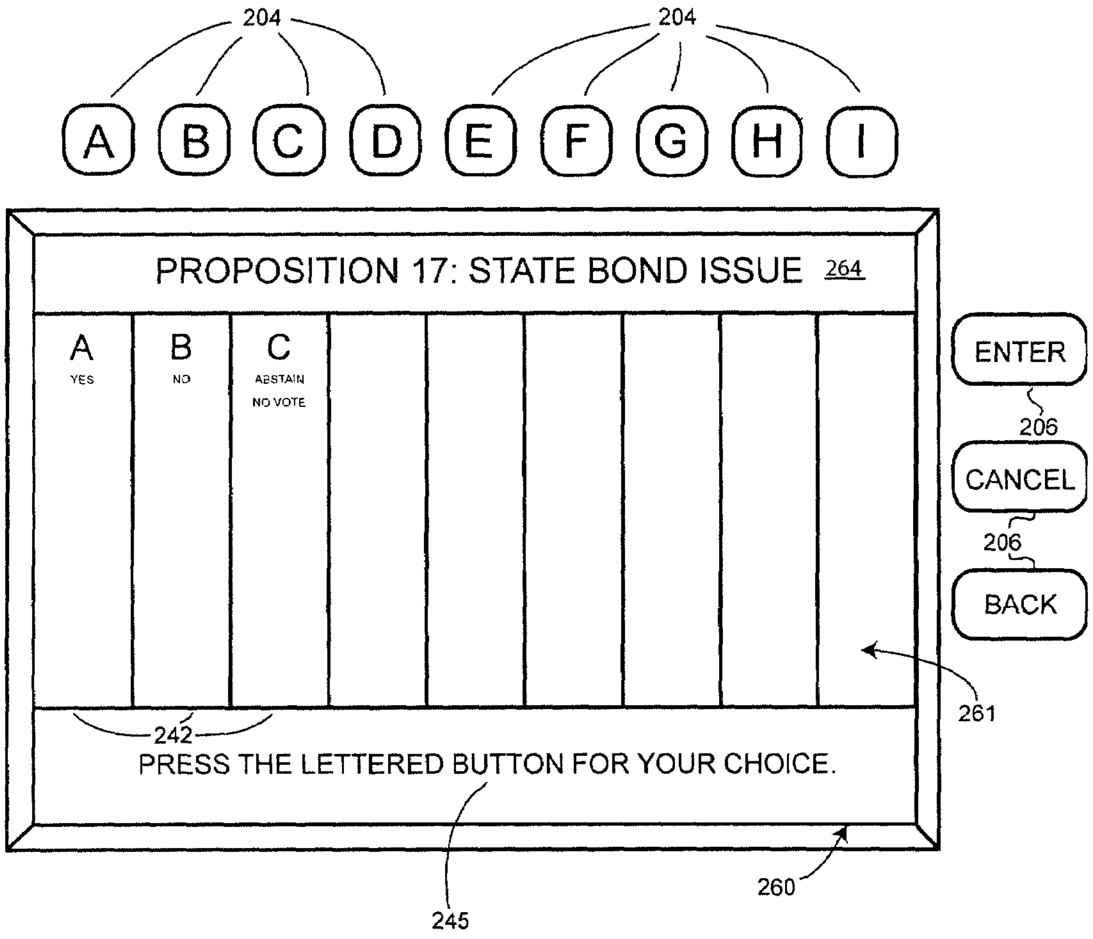

An example of a question, referendum, or the like, is shown on the screen display 260 of FIG. 11, to which attention is also directed. The question is shown as the middle element 261 on the screen display 260. The upper element 264 is the question, for example, "PROPOSITION 17: STATE BOND ISSUE" and the lower element 265 is the instruction, for example "PRESS THE LETTERED BUTTON OF YOUR CHOICE", other informational segment, or the like. For example, the voter 50' touched the button 204, labeled "A", to vote YES to Proposition 17, the STATE BOND ISSUE.

Figure 12:
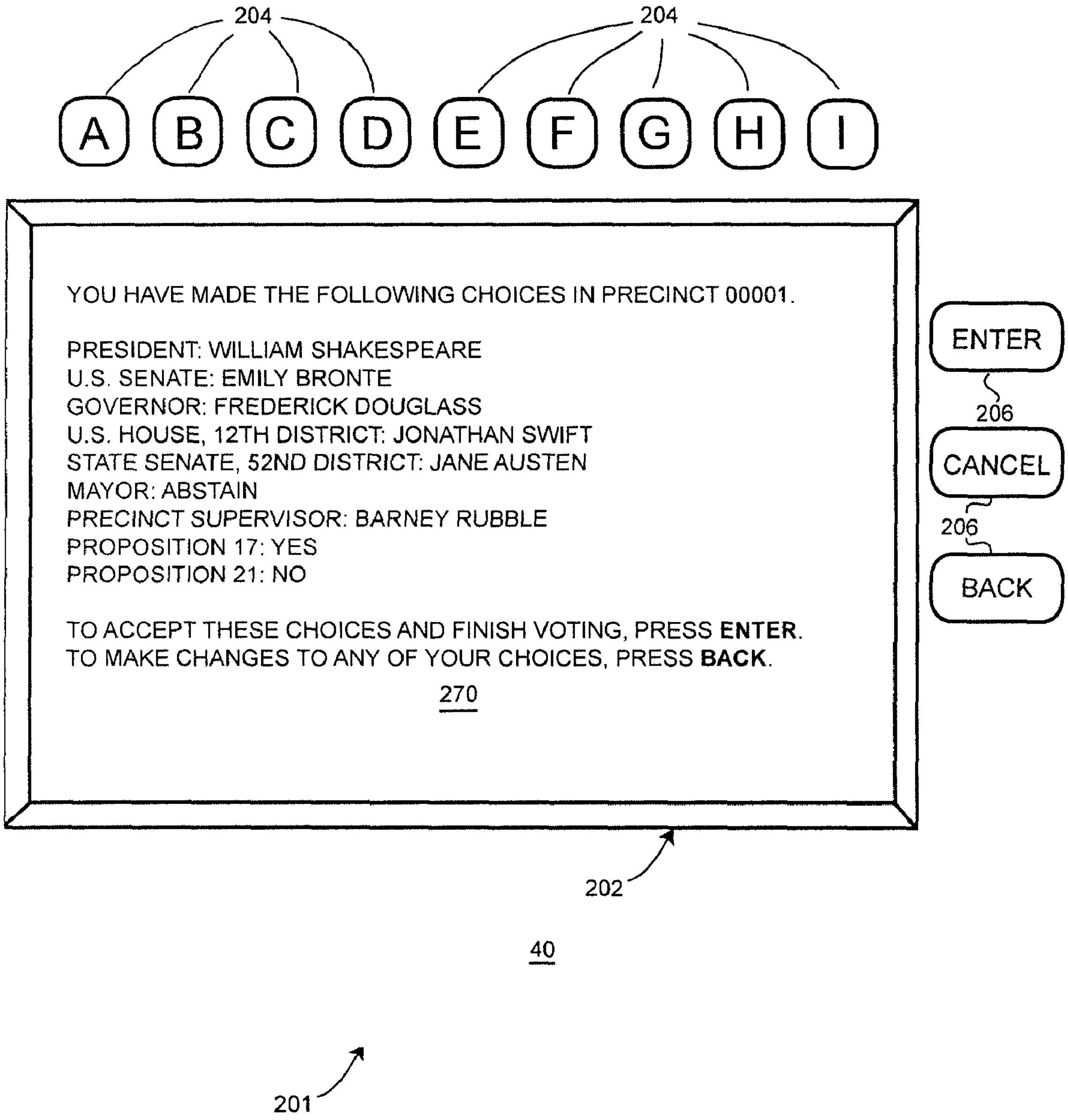

After the voter 50' presses ENTER for a given contest or question, the next contest or question in the sequence will appear onscreen. This will continue until the voter 50' has seen all of the contests or questions that his precinct identification allows him to vote in. At the end of the process, the voter 50' will be shown a final screen display 270, as shown in FIG. 12, which lists all of his votes.

At this point, the voter 50' is given the choice to revise his votes or cast them officially. This can be performed by the voter 50' pressing the action button 206 labeled BACK. The screen displays will scroll backward sequentially every time he presses the BACK action button, until he reaches the screen display with the screen display he wishes to review or change (revise). The voter can revise his votes by pressing the requisite selection button 204 ("A" through "I"). He would then move forward to the final screen display 270 by pressing the ENTER button on all successive screen displays, until he reaches the final screen display 270 again.

The voter 50' can also accept his votes by pressing the action button 206, labeled ENTER, on screen display 270. This action renders his ballot as officially cast.

With the ballot officially cast, the voter 50' receives a paper receipt 280, as shown in FIG. 13A, from the voting machine 40, at block 114. The receipt 280 lists, for example, the voting machine number, the voter's precinct, and the votes cast by the voter 50', along with any other preprogrammed messages, the election board wishes to provide to the voters. The voter 50' then places his receipt 280 into the machine's receipt box 218 through the slot 207*b* in the front side 201 of the machine 40, at block 116. This receipt 280 serves as a back-up, should there be problems with the hard disc 216, or should there be a manual recount or dispute.

Figure 10B:
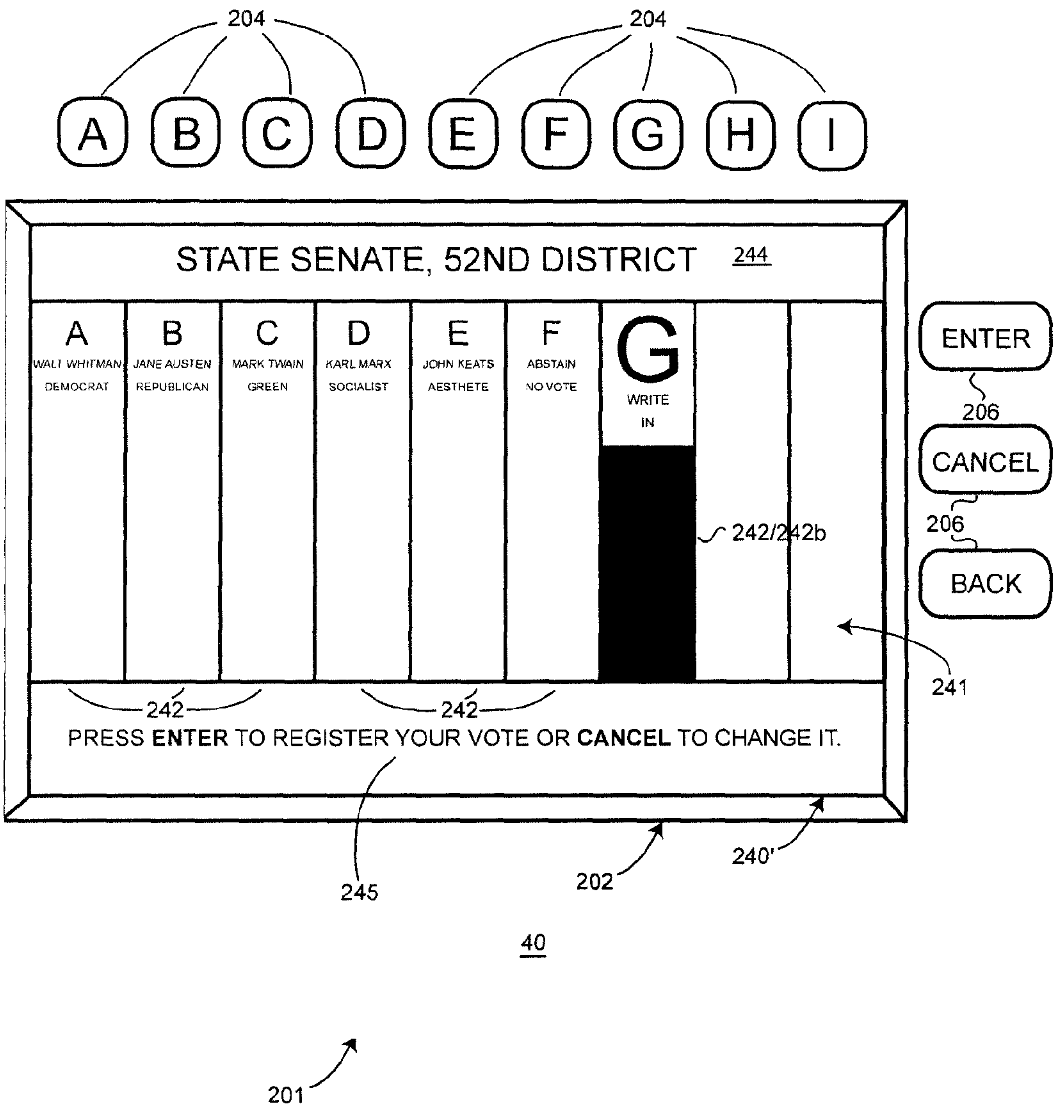
Figure 10C:
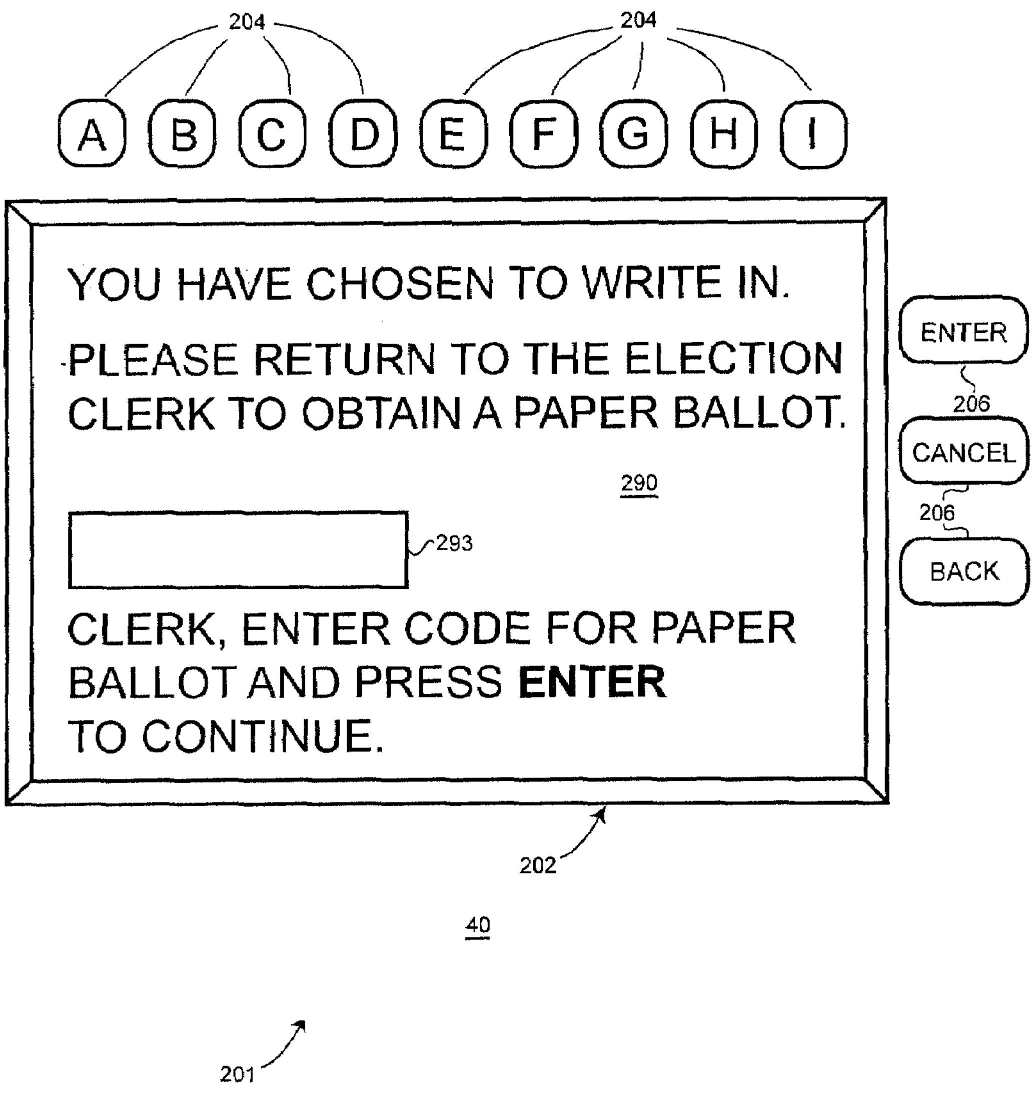

However, returning back to FIG. 9, and block 112, should the voter wish to write-in a candidate for this particular contest, he selects button "G", the column for a "WRITE-IN" 242*b*, as shown by the screen display 240' of FIG. 10B. Once the voter presses the action button 206 labeled ENTER, he will see the screen display 290 of FIG. 10C, where he is instructed to see the Election Clerk or other Election Supervisory Official for a manual (paper) ballot, on which his entire election will be cast.

After a voter has chosen to write in a candidate, he notifies the Election Clerk or other Election Supervisory Official 55 of this decision. The Election Clerk or other Election Supervisory Official then provides the voter with a manual ballot, specific to his precinct (printed in real time from the terminal 22 via the ballot printer 37), and will enter a code into the box 293, indicating that there is a manual (paper) ballot for this voter (as data for this is sent to the hard drive 216). A paper receipt 280', as shown in FIG. 13B is printed accordingly, for placement into the slot 207*b*, at block 114, and the receipt box 218, at block 116. With the code having been entered into the box 293 by the Election Official, the machine 40 returns to the screen of FIG. 7 for the next voter.

The voter completes the manual ballot. The completed manual ballot is placed into a secure container for manual ballots, for example, the ballot box 37*a*, which is maintained by the election officials at each polling place. The ballot boxes 37*a* are taken as part of the process, detailed below and in accordance with the diagram of FIG. 15, and these manual ballots are tabulated in accordance with known election practices, and, for example, are typically counted manually ("by hand"), as detailed below.

Alternately, returning to block 104 of FIG. 2, a voter may opt out of the process altogether and request a manual ballot once checked in and considered eligible for this election. The manual ballot, that is precinct-specific for that voter, is printed, as detailed above. Once the voter completes the manual ballot it is placed into the ballot box 37*a* as detailed above.

Still alternately, should one or more machines 40 malfunction, or some other circumstance occur necessitating manual ballots, the aforementioned manual ballots may be used.

Examples of manual (paper) ballots are shown in FIG. 14A-14D, to which attention is also directed. For each election anywhere in the state on a given election day, the slate of eligible candidates for that election would be rendered as a visual ballot element specific to that election. In this document, the "Visual ballot element" refers to the visual representation of each election, e.g. the slate of candidates for Governor. For example, if candidates Laurence Sterne and Alexander Pope qualify to run for mayor of a given city, they would be the candidates whose names would appear in the visual ballot element for mayor 350. For example, for New York, the composite visual ballot image for each of the state's 16,278 precincts would thus consist of the entire collection of the visual ballot elements for all of the elections in which a voter of that precinct is eligible to vote on a given election day.

Figure 14A:
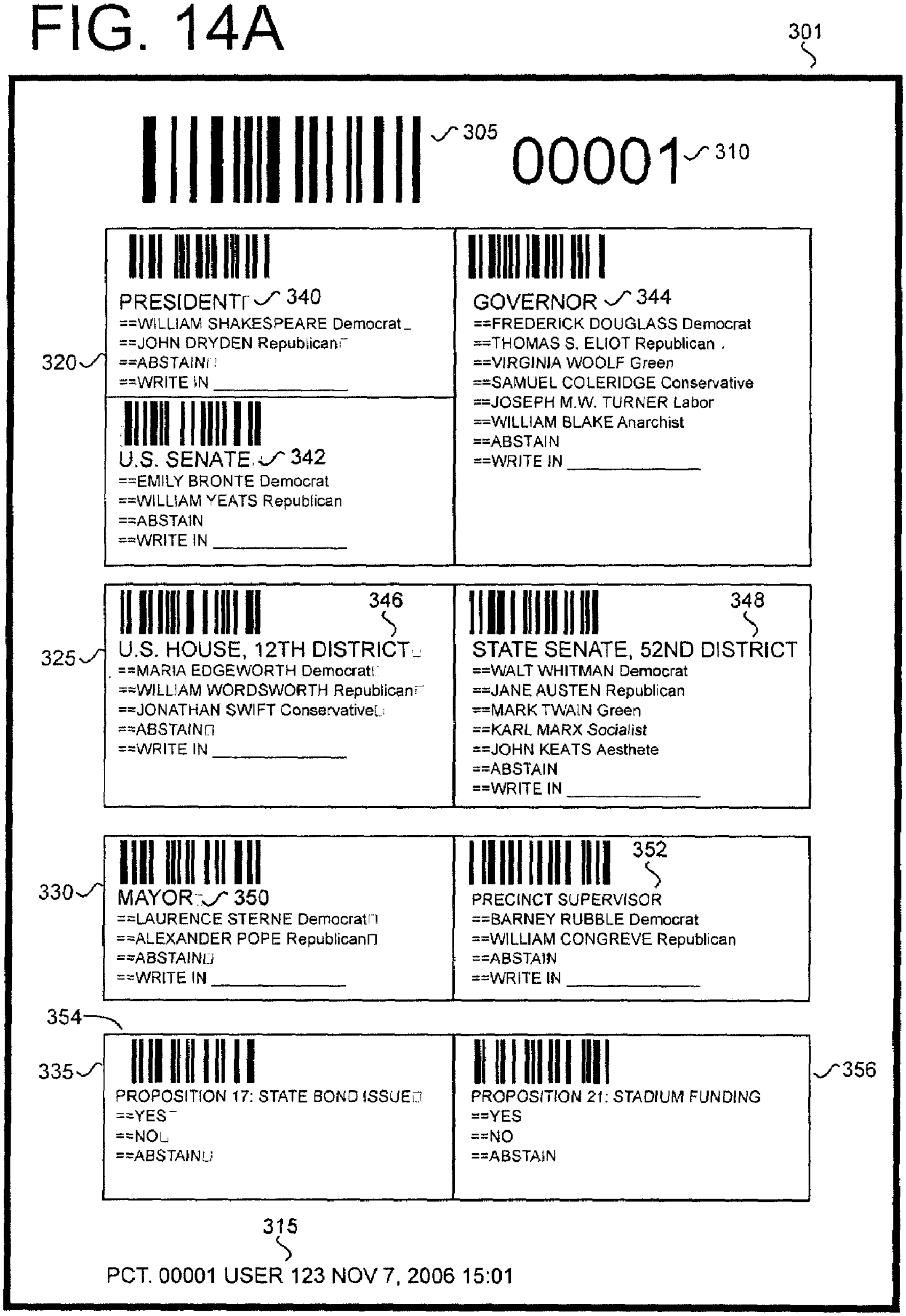
FIGS. 14A-14D are exemplary blank and completed manual or paper ballots used with the disclosed subject matter.
Figure 14B:
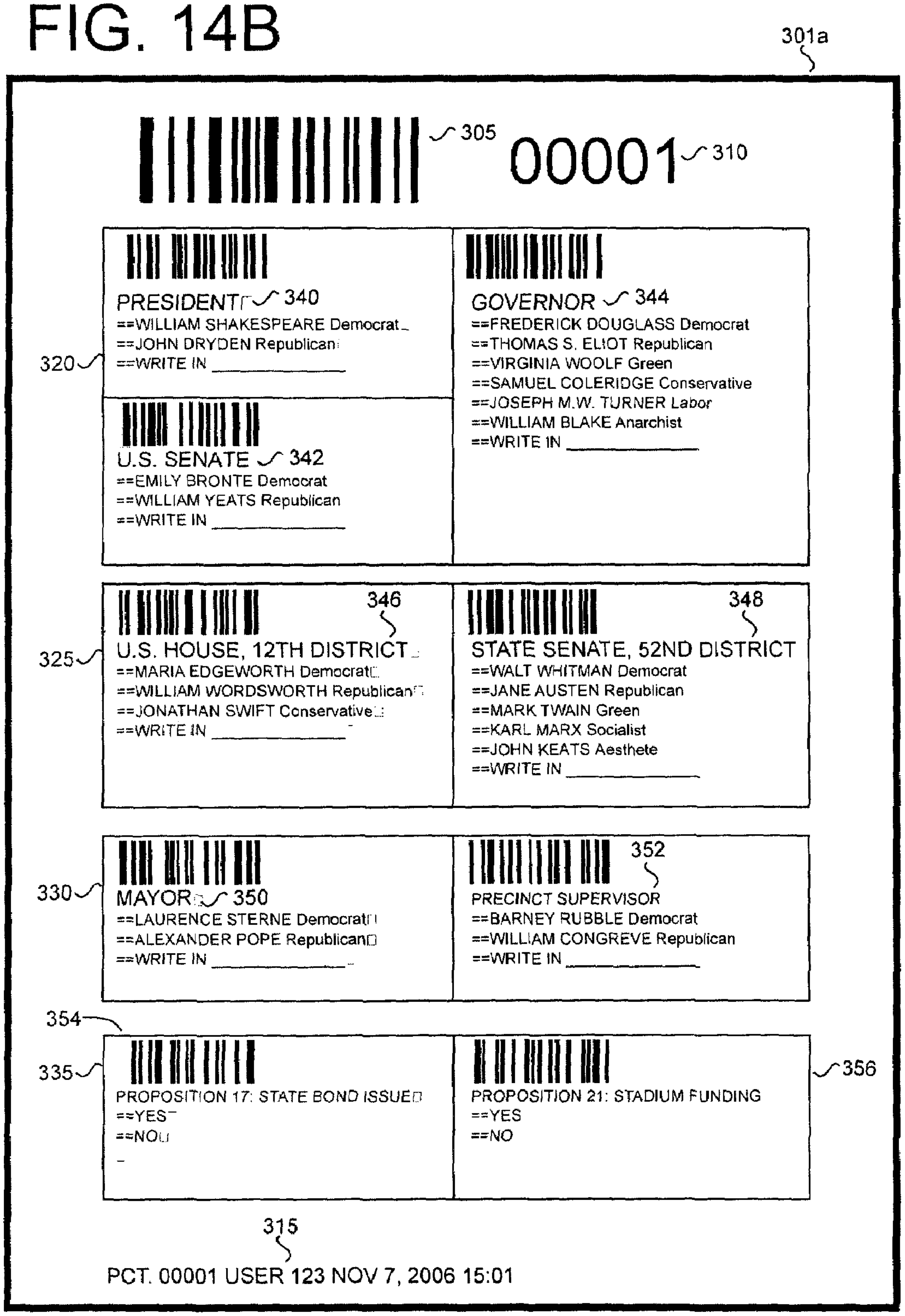

Each of the precinct-specific composite visual ballot images (for example, in New York there would be 16,278 precinct-specific composite visual ballot images for each of the 16,278 precincts) consists of sections, for example, four sections, as shown in FIGS. 14A and 14B. The manual ballots 301 (FIG. 14A), 301*a* (FIG. 14B), may include a precinct-specific bar code 305 at its top to facilitate automated ballot reading. It may also include the Hindu-Arabic precinct number at its top 310 to assist election officials in identifying ballots which may need to be recounted in the event of a contested election that requires some but not all of the precincts' ballots to be recounted. The bottom of the ballot may include a line of data 315 that identified which polling place generated the ballot as well as a time and date stamp and a user number to show where the ballot fit in the sequence of ballots printed at that polling place on that election day. The differences between the ballots 301 and 301*a* is that ballot 301 includes a choice for ABSTAIN, while ballot 301*a* lacks the choice ABSTAIN, such that an abstention is made by leaving the entire section blank (a default).

For example, on both ballots 301, 301*a*, the uppermost section 320 may depict all statewide elections, such as U.S. President 340, U.S. Senator 342, and Governor 344. The uppermost visual section 320 may appear on every ballot in the state as it contains the statewide elections. The upper middle visual section 325 may depict the U.S. Congressional election 346 and state legislative election 348 appropriate to the precinct of each voter's registration. The lower middle visual section 330 may depict the municipal and other local elections 350 and 352 appropriate to the precinct of each voter's home or assigned precinct. The bottom visual section 335 may depict referendums 354, 356, appropriate to the precinct for the voter's home or assigned precinct.

Figure 14C:
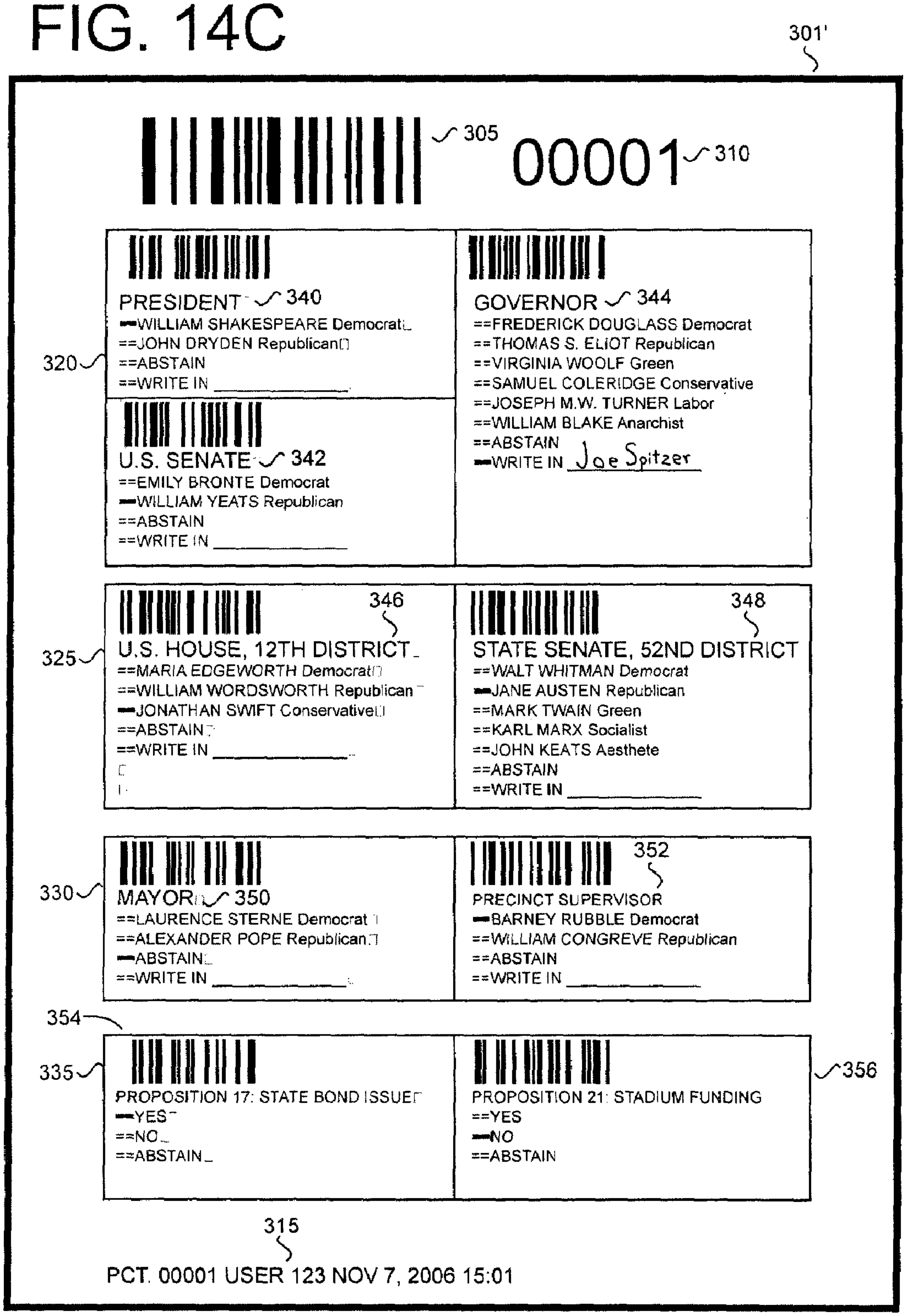
Figure 14D:
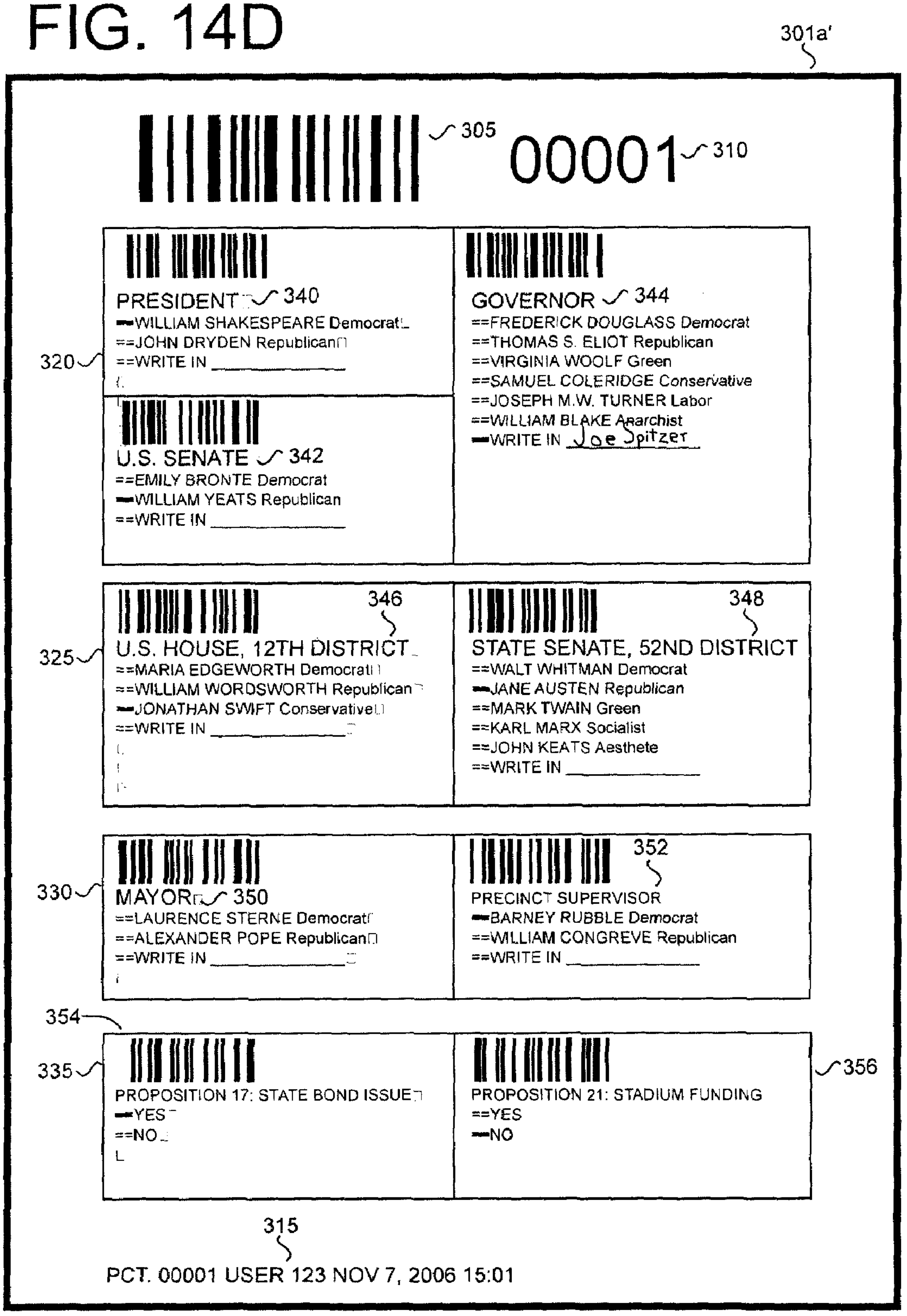

The ballot 301 is such that there is a space to mark the voter's candidate or question choice, as well as a space for making an abstention, while in the ballot 301*a*, the abstention space is not present, such that leaving all of the spaces blank indicates an abstention (a default position). Where necessary in ballots 301 and 301*a*, there is a space for choosing to write-in a candidate with a line for the actual written-in name. FIG. 14C shows a sample completed ballot 301', for the ballot 301 of FIG. 14A, while FIG. 14D shows a sample completed ballot 301*a*', for the ballot 301*a* of FIG. 14B.

In years when there are too many elections or too many candidates to fit the entire ballot on a single sheet of ballot paper, any of the three sections can be given its own dedicated sheet of ballot paper. Each ballot will otherwise appear on a single sheet of ballot paper.

All manual (paper) ballots are administered in accordance with conventional election practices for manual (paper) ballots. Once each manual (paper) ballot is completed, it is placed in the ballot box 37*a* of the polling place, in accordance with conventional election procedures, and counted manually (by hand), as detailed below. Although the ballots 301, 301*a* are optical scan ballots, capable of being counted by an optical scanner, reader, other machine or computer, the ballots 301, 301*a* are also manually countable.

The Hard Drive

The hard drive 216 of every voting machine 40 in the jurisdiction, for example, a state, is loaded with the same information as every other hard drive for any given election day. The information stored on each hard drive 216 includes a large spreadsheet-style document or database (hereinafter, "spreadsheet"), as shown, for example, in FIG. 15, that includes the offices, candidates' names, and candidates' party affiliations for each contest to be held on a given election day anywhere within the state. There is also a data storage for indicating the number of manual (paper) ballots that replaced electronic ballots due to write-ins.

The spreadsheet typically also includes all the ballot questions, propositions, and referenda, and all their possible voter responses (e.g., Yes, No, Abstain) for each question to be held on a given election day anywhere within the state. The spreadsheet includes spreadsheet cells for recording how many votes are cast, from each precinct, for each candidate in each contest and for each question. The hard drive 216 is configured with the software necessary to access the spreadsheet and record votes therein.

The hard drive 216 also includes software for operating a visual user interface that guides the voter through each contest or question appropriate to his precinct by showing him one contest or question at a time. Each contest or question appears to the voter in a succession of screens.

The voting machines 40 are not networked or accessible online. This maintains security of each voting machine 40.

Figure 16:
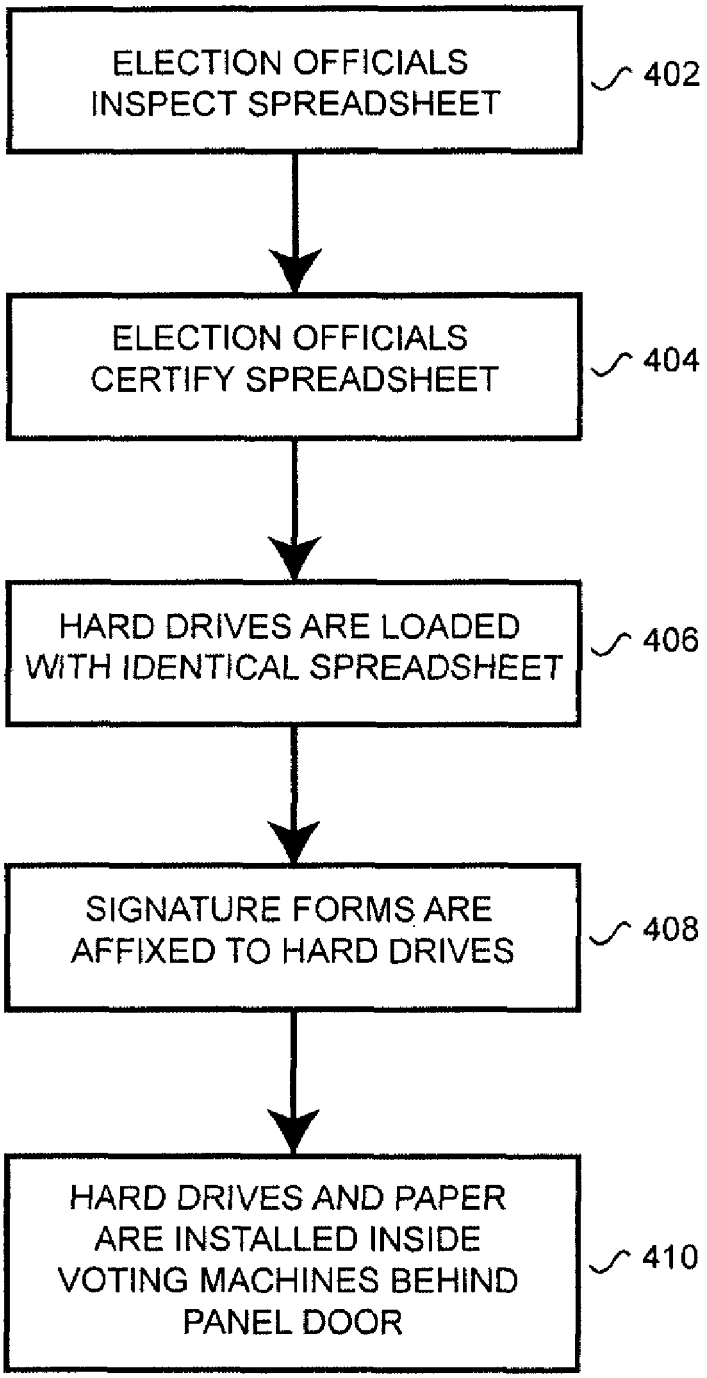
FIG. 16 is a flow diagram detailing a process of loading and placing hard drives in voting machines in accordance with the disclosed subject matter.

Turning also to FIG. 16, election officials inspect the spreadsheet for the election, at block 402, and certify the spreadsheet, at block 404. The hard drives 216 are loaded with the information, identical spreadsheets for each voting machine 40, for each election day, at block 406. This loading is, for example, manually, through universal serial bus (USB) cables, or other peripheral-attachment means, connected to a server that is not connected to the internet or any other public network, at a facility overseen by the board of elections. The non-networked aspect of the voting machines 40 assures that the voting machines 40 are not susceptible to online attacks by computer hackers. Each voting machine 40 stands alone and its voting information must be manually connected and manually removed before and after voting hours.

Signature forms for the election officials are affixed to the hard drives 216, at block 408. At block 410, the hard drives 216 and paper (typically paper rolls) are installed inside the voting machines 40, behind the door 212.

The Software

Each hard drive 216 is loaded with the same spreadsheet for recording votes from every precinct for every local, state, or federal election and referendum held anywhere in the state. (The machines 40 show each voter only the elections and referendums for the precinct in which he is registered.)

Each precinct in the state has its own row in the spreadsheet. New York is divided into 16,278 precincts. Therefore, voting machines 40 in New York would have 16,278 precinct rows. The row heading for each row would contain the five-digit number corresponding to the precinct number for that row. The row for Precinct 724 would thus have the row heading 00724.

Elections and the candidates who run in them will be represented by columns in the spreadsheet, as will referendums and their possible answers. For every election or referendum, there will also be an Abstain column specific to that election or referendum. For every election held in the state on election day, the number of columns devoted to that election will always equal the number of candidates in that election plus one column for voters who abstain in that particular election.

For example, if a state has 15 U.S. House districts, each with three candidates, then the number of columns devoted to all U.S. House elections in the state would be 60. For example, as shown in the spreadsheet of FIG. 15, if three candidates run for the U.S. House seat in the 11th District, there would be four columns for that election. If the candidates in that election were Smith of the Democratic Party, Jones of the Republican Party, and Chang of the Green Party, the four column headings for that election would be H11SmithDem, H11JonesRep, H11ChangGre, and H11Abstain. The rows would correspond to the precincts, of which there are 16,278 in New York.

As voters registered in the 11th District's precincts cast their votes on machines across the state, each machine will record the votes in the appropriate precinct row for each voter, and in the appropriate column for each candidate. For example, if a voter from Precinct 00376 (a precinct necessarily within U.S. House District 11) casts votes for Douglass (Democrat) for Governor, Jones (Republican) for U.S. House District 11, and Abstention for State Senate District 23, then the number of votes for GovDouglDem, H11JonesRep, and SS23Abstain would increase by 1 vote in each column in the row for Precinct 00376.

When the state board of elections compiles the data from all the machines 40 in the state, the compiled data shows the total number of votes for each candidate in each election, as well as each precinct's total vote for each candidate in each election in that precinct.

Procedures for Election Officials

Before the hard drives 216 are loaded with the spreadsheet for a given election day, the software is inspected, tested, and approved by state election officials. Upon approval, each hard drive 216 is loaded with the same information and software and installed into the voting machines 40. The top side of the exterior of the hard drive 216 contains a serial number and an index-card-sized sticker with a signature line for election officials (hereinafter, the "signature form").

Figure 17A:
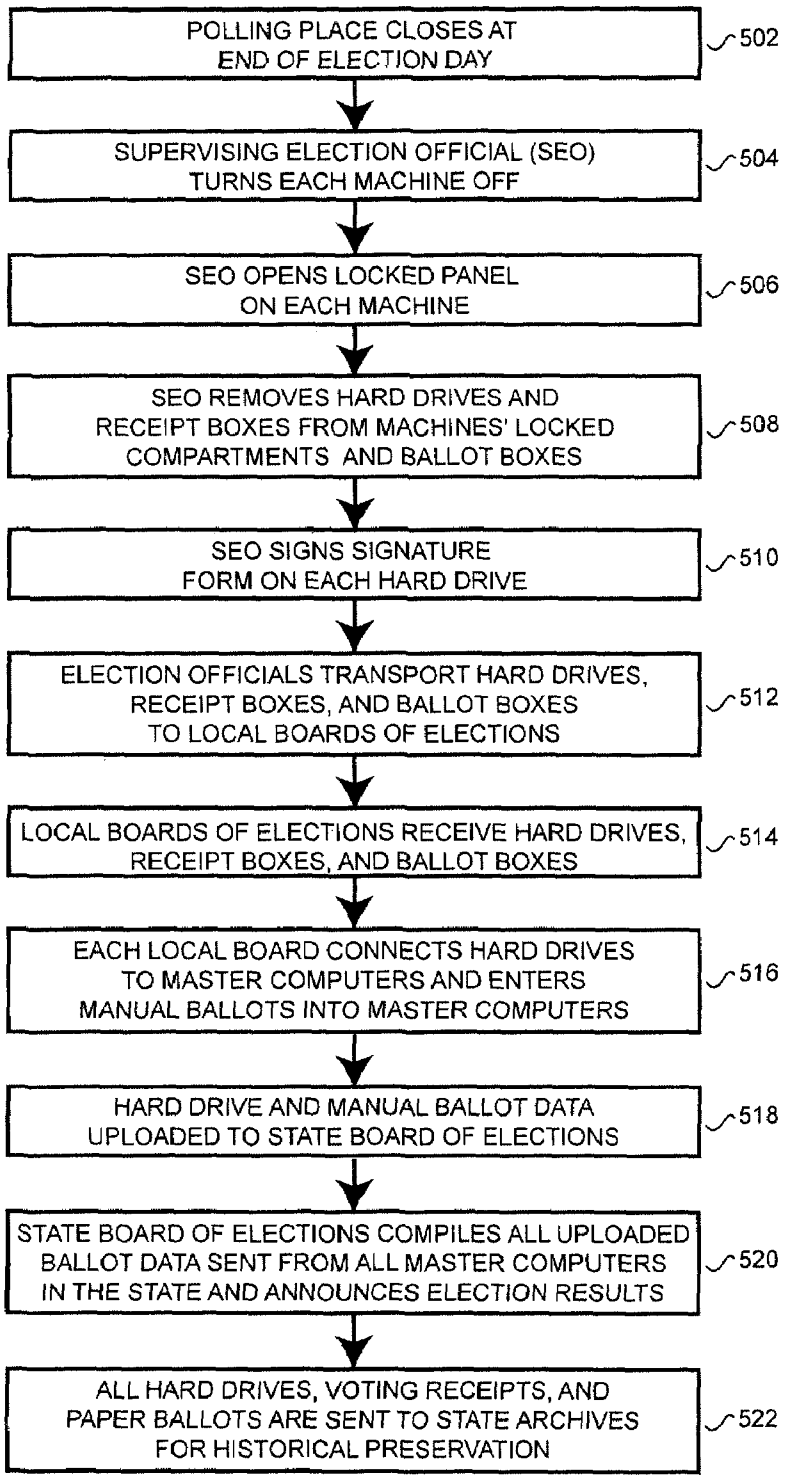
FIG. 17A is a flow diagram detailing a process of obtaining election results in accordance with the disclosed subject matter.
Figure 17B:
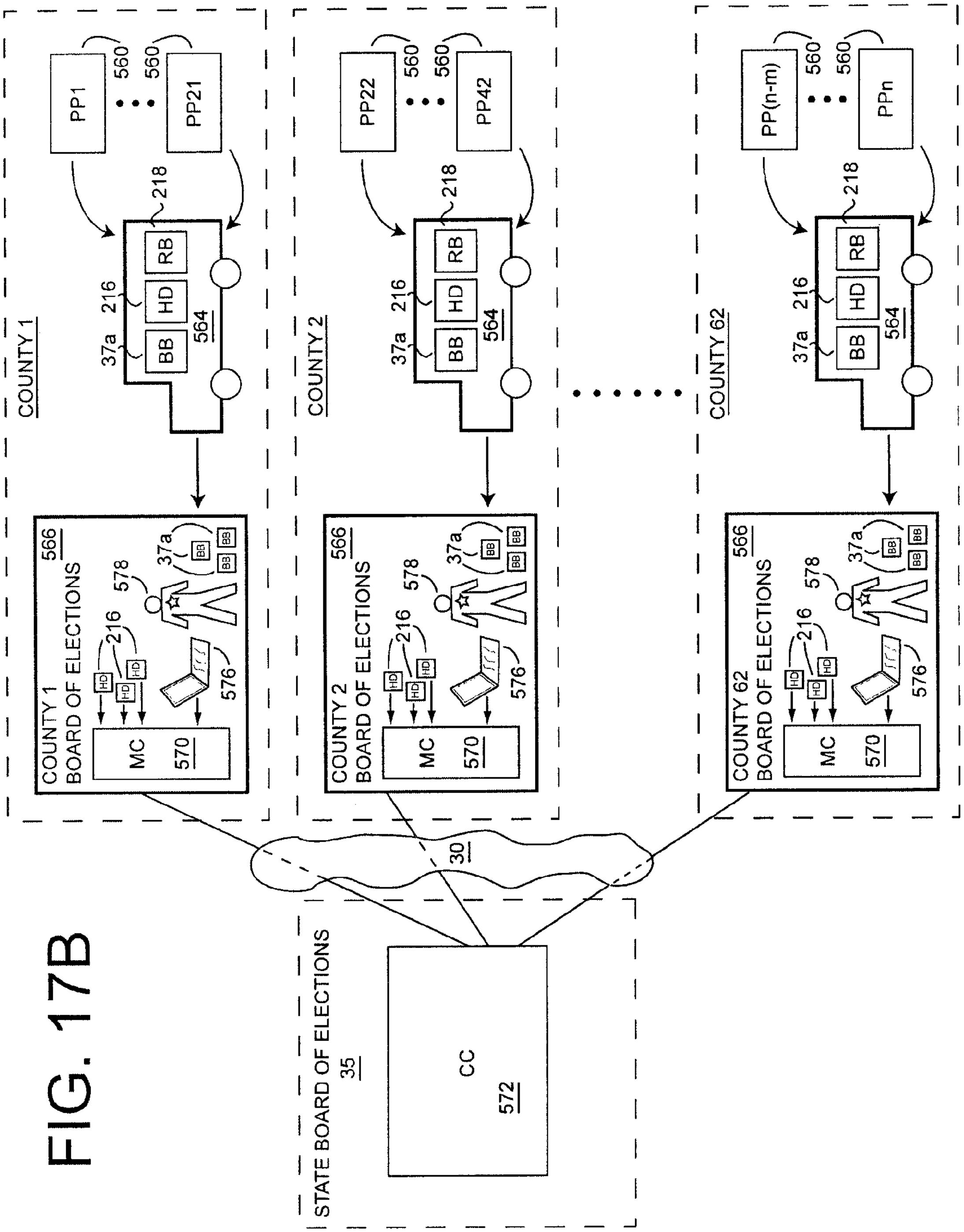
FIG. 17B is a diagram illustrating events of the flow diagram of FIG. 17A.

Attention is now also directed to FIGS. 17A and 17B, detailing the procedure for election officials, once voting is over and the polling places have closed statewide. In FIG. 17B, "n" is the last number of a group or sequence and "m" is a reduction factor, to reduce "n" by a predetermined number.

At the end of voting hours on election day, and the polling place is considered closed, such that no more votes may be cast and no more ballots will be accepted, at block 502, the supervising election official (SEO) at each polling place (PP) 560 turns off the respective voting machine 40, at block 504. The supervising election official then transports the voting information, hard drives (HD) 216, receipt boxes (RB) 218 and ballot boxes (BB) 37*a* (illustrated by the trucks 564), to the nearest office of the board of elections (for example, the County Board of Elections 566 of the County for the requisite precincts, covered by the requisite polling places (PP) 560.

The supervising election official will perform the following steps for removing and transporting the voting information. First, he will turn off the respective machine 40 and unlock the machine's locked door (panel) 212, at block 506. Second, he will remove the receipt box 218 of printed voting receipts 280/280'. Third, he will detach and remove the hard drive 216 from the machine 40, at block 508, and sign his name on the signature form associated with the requisite hard drive 216, at block 510. The supervising election official will then physically transport the ballot box 37*a*, and the hard drive 216 and receipt box 218 (illustrated by the truck 564), to the nearest office of the local or county offices of the board of elections 566 (collectively, the "local board of elections"), at block 512.

Each local board of elections 566 will receive the hard drives 216 and receipt boxes 218, and ballot boxes 37*a*, for all of the polling places, at block 514. At block 516, the local board of elections 566 will then connect each of the hard drives 216 to a networked computer, or master computer (MC) 570. Also, any manual ballots (from the ballot boxes (BB) 37*a* are entered into a computer terminal 576, workstation, or the like, by an operator 578. The computer terminal 576 is programmed, for example, to tabulate the votes by converting them to ballot (voting) data, and send this ballot data to the master computer 570. The computer terminal 576 is, for example, programmed to control operation of the master computer 570.

The master computer 570 uploads the spreadsheet and the ballot data to a central computer (CC) 572 (for example, over the network 30) at the state board of elections 35, at block 518.

The state board of elections 35 combines and compiles all data, including the votes from all of the hard drives 216 from all voting machines 40, and the ballot boxes 37*a*, as electronically received from each master computer 570 of each County (local) Board of Elections 566 in the state, to count the votes. This compilation at the State Board of Elections 35, to count the votes, is performed by the central computer (CC) 572, but when necessary, may be performed manually, or manually and computerized. The votes are counted to obtain the final election results, at block 520. Also at block 520, the election results are announced to the public. The process ends at block 522, as all hard drives 216 and voting receipts 280, 280' (from the receipt boxes (RB) 218), and manual ballots (from the ballot boxes (BB) 37*a*), are sent to a storage facility, such as the state archives, for historical preservation and safekeeping.

Electronic System with Optical Scan Ballots

Figure 18:
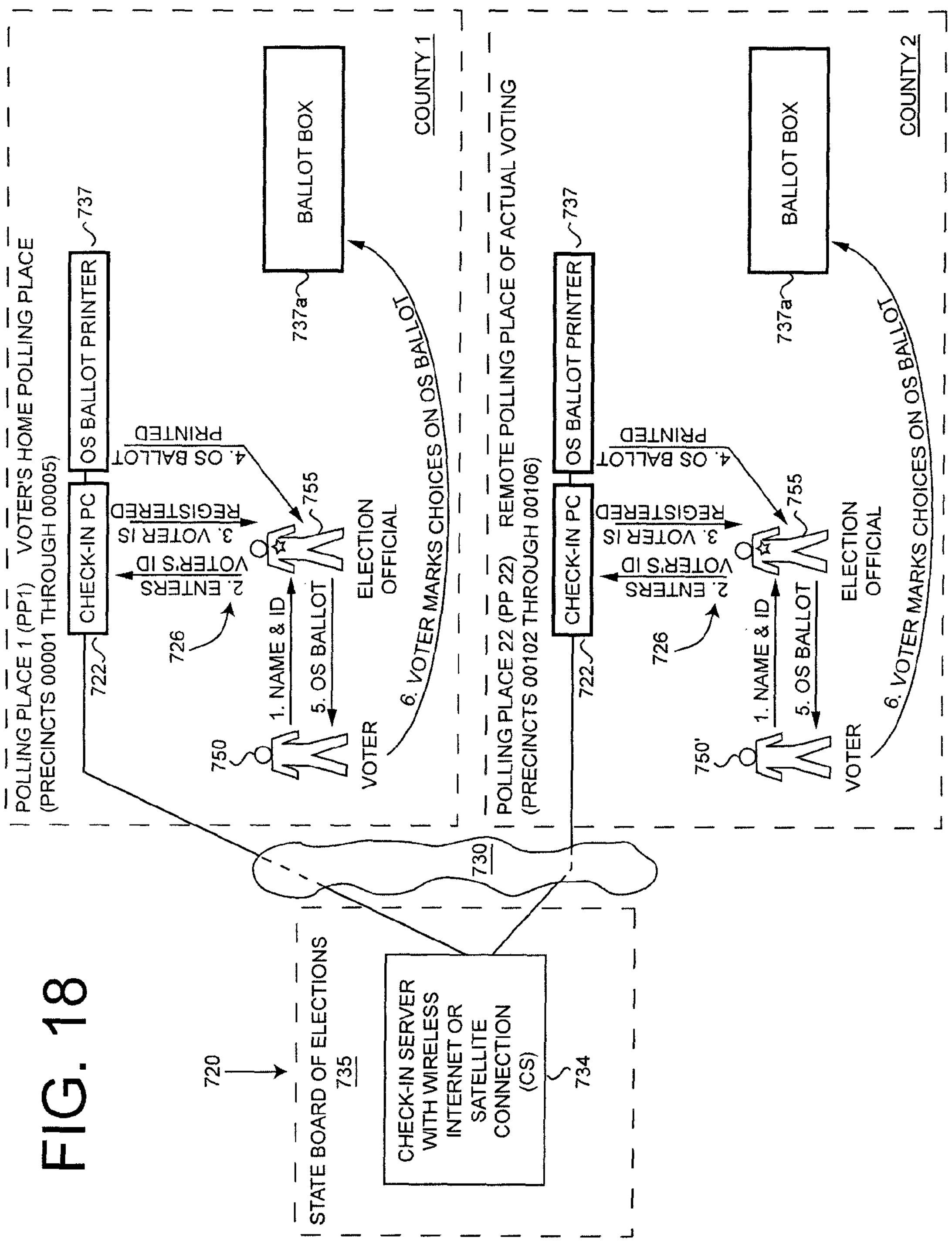
FIG. 18 is a diagram of the voting system of another embodiment of the disclosed subject matter.

Attention is now directed to FIGS. 18-20B, that detail an alternate system 720 and method of the disclosed subject matter. This system 720 is similar to the system 20 disclosed above and shown in FIGS. 1-17B, with the differences noted below. FIG. 18 shows the system 720 in accordance with the disclosed subject matter. The system 720 is similar to the system 20 and similar components have corresponding numbers in the "700's." Similar or identical aspects of this system 720 are in accordance with the descriptions above.

In this system 720, an optical scan modality is used for all ballots. The optical scan ballot is a form of a manual ballot. The two modalities achieve the same result, i.e., a statewide all-jurisdictions voting system with centralized counting of votes, where voters may vote at any single official polling place in the state (jurisdiction), such as one other than their home or assigned polling place based on their registrations.

The system 720 includes terminals 722 at a check-in desk, and corresponding check-in stations 726. The terminals 722 and check-in stations 726 are computers, computing devices, work stations, and the like. Each terminal is electronically linked to a ballot printer 737, for example, an optical scan ballot printer. The ballot printer 737 includes various hardware, software and combinations thereof, including processors and the like for controlling its operations, as detailed herein.

Each terminal 722 is also electronically linked to a network 730 such as the Internet, typically through gateways, so as to be in data communication with a check-in server (CS) 734, or other central computer, typically of the Jurisdiction's Election Board 735. Once a voter 750, 750' has checked in at a check-in station 726, they proceed to vote by marking an optical scan ballot 301/301*a* (FIGS. 14A and 14B), in accordance with the disclosed subject matter, detailed below.

Procedures for Voter Check-In and Voting in the Optical Scan Modality

Figure 19:
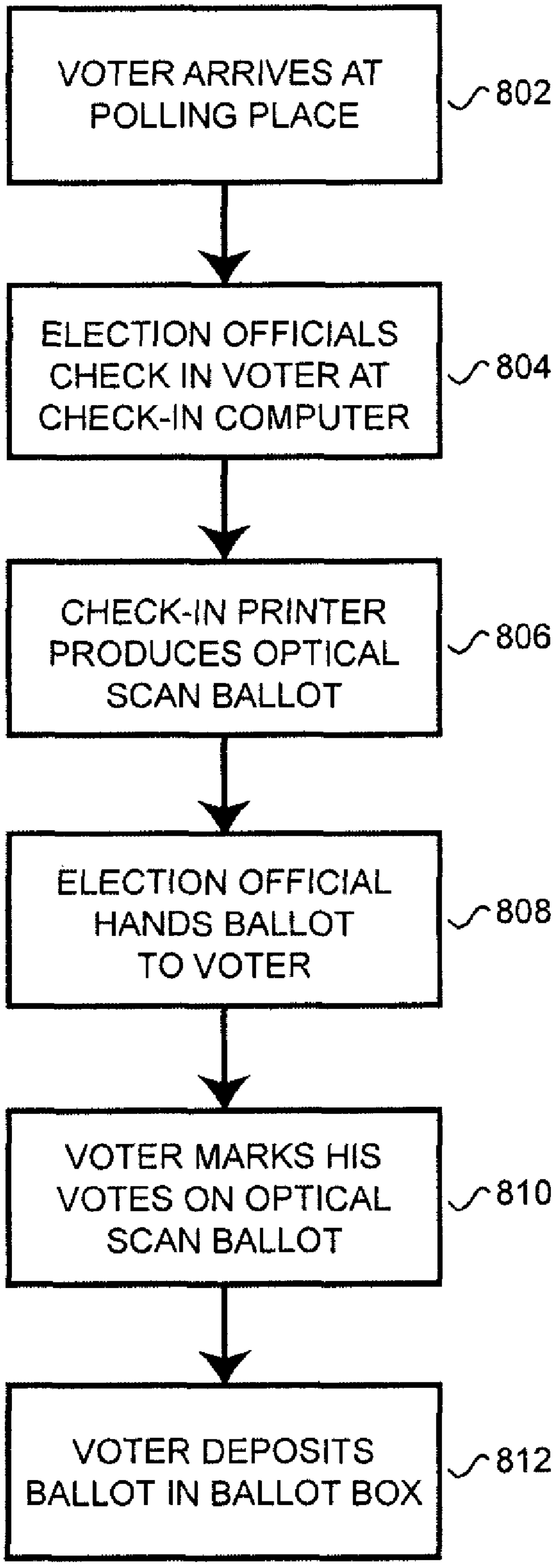
FIG. 19 is a flow diagram detailing the check-in and voting processes in accordance with the embodiment of FIG. 18 of the disclosed subject matter.

FIG. 19, to which attention is also directed, details an exemplary process in accordance with the disclosed subject matter, for voters 750, 750', who are registered in Precinct 00001 and vote at Polling Place 1 of County 1, their home or assigned polling place. For description purposes, two voters 750, 750', representative of multiple voters, are shown in FIG. 18, and will be referred to generally when explaining the disclosed system 720 and method. Voter 750 is representative of voters who are voting at their home or assigned polling place, while voter 750' is representative of voters who are voting outside of their home or assigned polling place. Voter 750' will be referenced as a specific example of a voter voting out of his home or assigned polling place, that covers his home precinct, and home county, to explain the disclosed subject matter.

The voting process is now described, with attention to FIG. 19. The voter 750', with an assigned polling place of, for example, Polling Place 1 (PP1) in County 1, arrives at the polling place, for example, a polling place different than his home or assigned polling place (Polling Place 22 in County 2), at block 802. There is an initial procedure for voters to check in, at block 804.

The check-in process for the system 720 is similar to that described for the system 20 above. Voter check-in involves check-in terminals 722 at the check-in desk, that define the check-in stations 726. Once at the check-in station 726, the voter 750, 750' identifies himself to election official 755 by any acceptably defined identifier the election authorities of his state (jurisdiction) require, as detailed above. The election official 755 then enters the voter's 750' identifying information into the terminal 722, as detailed above.

The networked check-in terminal 722 includes a hard drive which stores composite visual ballot images specific to each of the jurisdiction's subdivisions, for example, if New York, each of the state's 16,278 Precincts. In this document, the "composite visual ballot image" refers to the total ballot image specific to each precinct. If the voter 750, 750' is eligible to vote anywhere in the jurisdiction, for example, the state, as determined from the check-in procedure above, the state, the ballot printer 737 will generate a precinct-specific optical scan ballot, for example, optical scan ballots such as ballots 301/301*a*, as described above and shown in FIGS. 14A and 14B, for that voter based on his home Precinct. Accordingly, voter 750 and voter 750', regardless of their voting (polling place) location, will see and vote on the same ballot for their home or assigned precinct, for example, the ballot for Precinct 00001, detailed above, for example.

Once a voter 750' is checked in, a ballot (such as ballots 301 or 301*a*) with bar codes for optically scanning the voter's choices is printed, at block 806. The voter 750' receives an optical scan ballot appropriate to the precinct of his registration, for example, a manual optically scannable ballot 301 for Precinct 00001 as described above, and shown in FIG. 14A, from an election official, at block 808. The voter 750' marks the ballot 301 to record his voting choices, at block 810, and deposits the ballot in a ballot box 737*a*, at this polling place, for example, Polling Place 22 in County 2, at block 812.

Procedures for Election Officials

Figure 20A:
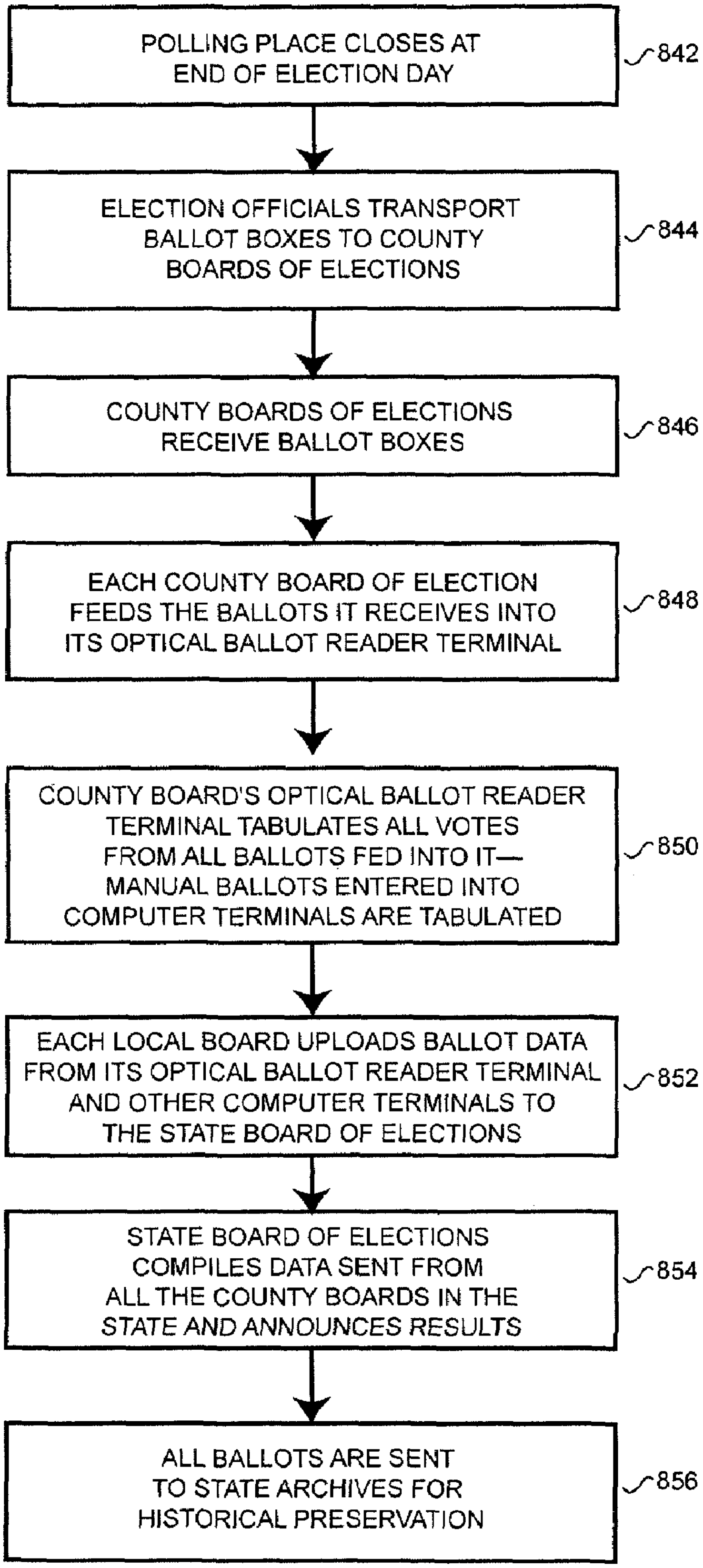
FIG. 20A is a flow diagram detailing a process of obtaining election results in accordance with the embodiment of FIG. 18 of the disclosed subject matter.
Figure 20B:
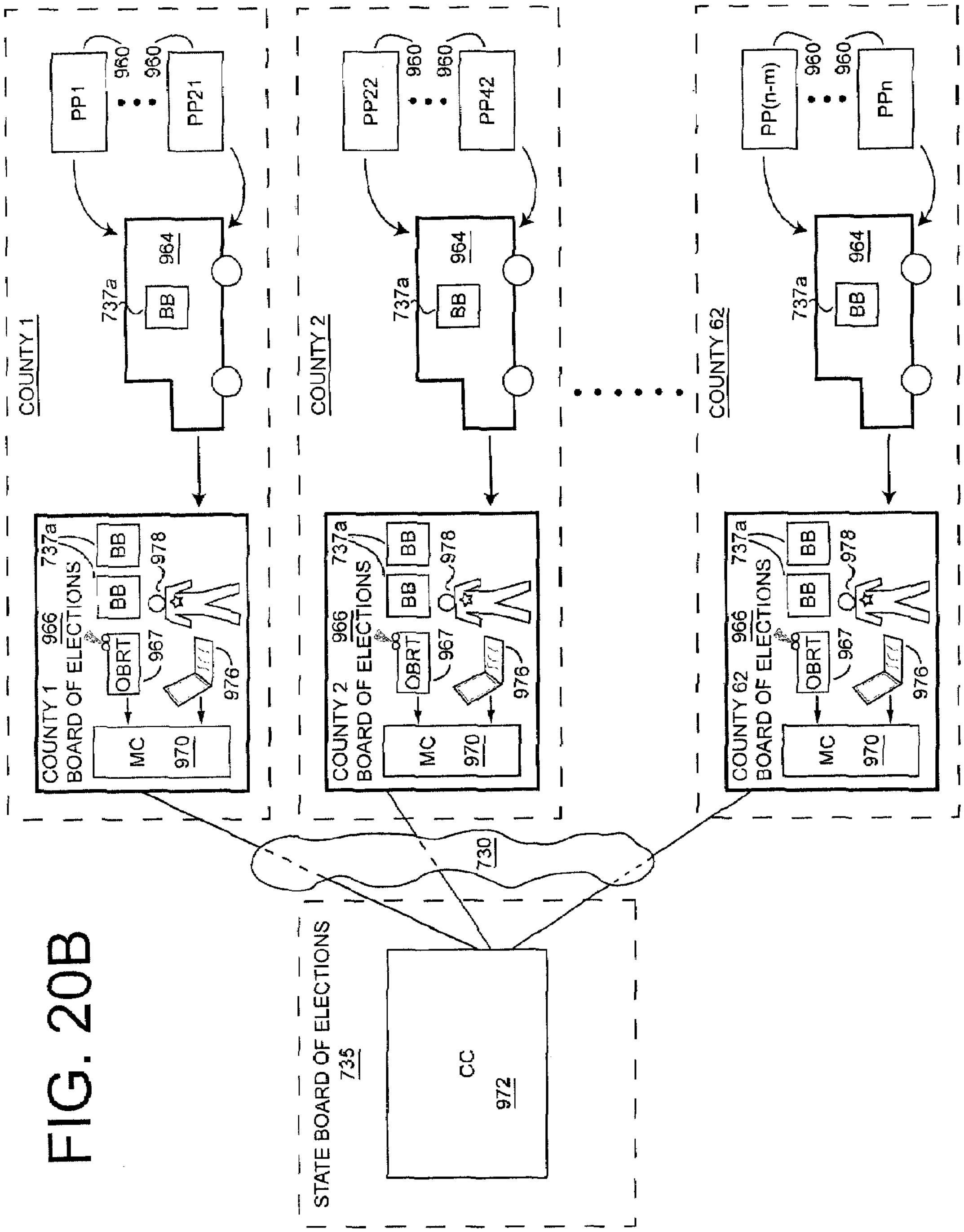
FIG. 20B is a diagram illustrating events of the flow diagram of FIG. 20A.

Each county board of elections is equipped with an optical scan ballot reader terminal (OBRT) 967 (FIG. 20B) which would include an optical scanner, for reading the ballots, a hard drive or other interactive storage media, other related hardware and/or software, and a spreadsheet capable of recording votes in all elections in all precincts for every local, state, or federal election and referendum held anywhere in the state. Attention is now directed to FIG. 20A and the accompanying diagram of FIG. 20B (in FIG. 20B, "n" is the last number of a group or sequence and "m" is a reduction factor, to reduce "n" by a predetermined amount). FIG. 20B is similar to FIG. 17A, with similar components numbered in the "900's."

The polling places (PP1 through PPn) 960, that cover all of the precincts in the jurisdiction, close at the end of the election day, at block 842. Election officials transport the ballot boxes 737*a* (as illustrated by the truck 964) from their respective polling places (PP) 960 to the corresponding local board of elections, for example, the County Board of Elections 966 for the County in which the polling place is located, at block 844. Each county board of elections 966 receives the ballot boxes 737*a*, at block 846.

After all of the ballots for the county have been fed into and read by the county board's optical scan ballot reader terminal (OBRT) 967, at block 848, the votes are tabulated (converted to ballot data) in the OBRT 967, at block 850. Also, at block 850, any manual ballots are entered by the operator 978 into the computer terminal 976, where the votes are tabulated (converted to ballot data). The ballot data from the OBRT 967 and computer terminal 976 is sent to a master computer (MC) 970. The master computer 970 uploads all of the received ballot (voting) data recorded in the county to the central computer (CC) 972 over the network 730, to the State Board of Elections 735, at block 852. However, should any OBRT 967 not function properly, the affected ballots may be counted manually (by hand), and entered into the master computer 970, through the computer terminals 976, as detailed above.

The state board of elections 735, at its central computer (CC) 972, receives and tabulates all votes from every master computer 970 of every county board of elections, in the state, for every local, state, or federal election and referendum held anywhere in the state, at block 854. All ballots are then sent to the state archives for preservation, at block 856.

While the systems and methods described above, have been shown for jurisdictions, such as New York, this is exemplary only. The disclosure is such that it can be easily modified for the particular jurisdiction, including all U.S. States, Territories, Federal Districts, and Possessions, and all particular jurisdictional divisions of all U.S. States, Territories, Federal Districts, and Possessions. The disclosure is such that it can be easily modified for foreign jurisdictions as well.

The processes (methods) and systems, including components thereof, herein have been described with exemplary reference to specific hardware and software. The processes (methods) have been described as exemplary, whereby specific steps and their order can be omitted and/or changed by persons of ordinary skill in the art to reduce these embodiments to practice without undue experimentation. The processes (methods) and systems have been described in a manner sufficient to enable persons of ordinary skill in the art to readily adapt other hardware and software as may be needed to reduce any of the embodiments to practice without undue experimentation and using conventional techniques.

While preferred embodiments of the disclosed subject matter have been described, so as to enable one of skill in the art to practice the disclosed subject matter, the preceding description is intended to be exemplary only. It should not be used to limit the scope of the disclosed subject matter, which should be determined by reference to the following claims.

What is claimed:

1. A method for voting, comprising:

determining the eligibility of a voter to vote in an election in a jurisdiction on a networked computer system;

providing a code corresponding to a division of the jurisdiction in which the voter is registered based on information stored in the networked computer system, if the voter is eligible to vote in the election; and, a non-networked machine providing a ballot corresponding to the code for the voter as received from the networked computer system, at any location in the jurisdiction, the ballot corresponding to the division of the jurisdiction in which the voter is registered.

2. The method of claim 1, wherein the location in the jurisdiction where the voter is provided the ballot includes a polling place different from the polling place that the voter is assigned, the assigned polling place for the voter corresponding to the division of the jurisdiction in which the voter is registered.

3. The method of claim 1, wherein the location in the jurisdiction where the voter is provided the ballot includes a polling place the same as the polling place that the voter is assigned, the assigned polling place for the voter corresponding to the division of the jurisdiction in which the voter is registered.

4. The method of claim 1, wherein providing the ballot includes providing an electronic ballot.

5. The method of claim 1, wherein the jurisdiction includes a U.S. State.

6. The method of claim 5, wherein the division of the jurisdiction includes a precinct.

7. A voting system comprising:

a networked portion configured for verifying the eligibility of a voter to vote in an election in a jurisdiction, the networked portion including a terminal for electronic communication with a central computer, the terminal configured for i) verifying the eligibility of a voter to vote in the election in the jurisdiction, and, ii) providing data corresponding to the division of the jurisdiction where the voter is registered; and a non-networked portion configured for providing a ballot at any location in the jurisdiction, the ballot corresponding to a division of the jurisdiction where the voter is registered, if the voter is eligible to vote in the election, the non-networked portion including interactive storage media configured for i) storing all ballots for all divisions of the jurisdiction, and, ii) providing the ballot for the division of the jurisdiction where the voter is registered in response to receiving the data provided by the terminal of the networked portion, the data corresponding to the division of the jurisdiction where the voter is registered.

8. The system of claim 7, wherein the non-networked portion provides the ballot electronically.

9. The system of claim 8, wherein the terminal generates a code corresponding to the division of the jurisdiction where the voter is registered.

10. The system of claim 9, wherein the non-networked portion includes at least one voting machine, the at least one voting machine for housing the interactive storage media, and the at least one voting machine includes a processor programmed to (i) receive the code for the division of the jurisdiction where the voter is registered, and (ii) retrieve an electronic ballot from the interactive storage media corresponding to the code.

11. The system of claim 7, wherein the jurisdiction includes a U.S. State.

12. The system of claim 11, wherein the division of the jurisdiction includes at least one precinct.

* * * * *